US009444317B2

(12) United States Patent
Shimizu et al.

(10) Patent No.: US 9,444,317 B2
(45) Date of Patent: Sep. 13, 2016

(54) ELECTRIC ROTATING MACHINE

(71) Applicant: YAMAHA HATSUDOKI KABUSHIKI KAISHA, Shizuoka-ken (JP)

(72) Inventors: Tsukasa Shimizu, Shizuoka-ken (JP); Haruyoshi Hino, Shizuoka-ken (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 336 days.

(21) Appl. No.: 13/955,027

(22) Filed: Jul. 31, 2013

(65) Prior Publication Data

US 2014/0042853 A1    Feb. 13, 2014

(30) Foreign Application Priority Data

Aug. 10, 2012  (JP) .................................. 2012-178049

(51) Int. Cl.
*H02K 21/14* (2006.01)
*H02K 21/16* (2006.01)
*H02K 29/03* (2006.01)

(52) U.S. Cl.
CPC .............. *H02K 21/14* (2013.01); *H02K 21/16* (2013.01); *H02K 29/03* (2013.01)

(58) Field of Classification Search
CPC ....... H02K 21/14; H02K 21/16; H02K 29/03
USPC .................... 310/156.01, 268, 191
See application file for complete search history.

(56) References Cited

U.S. PATENT DOCUMENTS

| 3,081,412 A * | 3/1963 | Emile Granier ....... 310/216.091 |
| 6,462,451 B1 | 10/2002 | Kimura et al. |
| 6,847,149 B2 * | 1/2005 | De Filippis ............ 310/216.008 |
| 7,550,894 B2 * | 6/2009 | Hino et al. ..................... 310/268 |
| 2010/0111731 A1 * | 5/2010 | Suzuki et al. ............. 417/423.7 |
| 2010/0213885 A1 * | 8/2010 | Ichiyama ...................... 318/720 |
| 2012/0049678 A1 * | 3/2012 | Kodama ......................... 310/90 |

FOREIGN PATENT DOCUMENTS

| EP | 1 670 124 A2 | 6/2006 |
| JP | 8-111968 | 4/1996 |
| JP | 2002-101628 | 4/2002 |
| JP | 2003-533158 | 11/2003 |
| JP | 2006-191782 A | 7/2006 |
| WO | WO 01/84696 A1 | 11/2001 |

OTHER PUBLICATIONS

Extended European Search Report, dated Dec. 4, 2014, issued in connection with the counterpart European application No./Patent No. 13179891.0-1903/2696485, 7 pages.
Foreign Office Action issued on Apr. 22, 2014, in connection with the Priority Japanese patent application No. 2012-178049, 4 pages.

* cited by examiner

*Primary Examiner* — Alex W Mok
(74) *Attorney, Agent, or Firm* — Rabin & Berdo, P.C.

(57) ABSTRACT

A magnetic resistance changing mechanism for changing a magnetic resistance of a stator magnetic path including a stator yoke portion and each tooth portion by mechanically changing the stator magnetic path is provided. A pair of side protruded portions are formed on circumferential sides of a rotor side end portion of each tooth portion. The rotor side end face of each tooth portion is shaped so that a gap between the rotor side end face of each tooth portion and an outer periphery of the rotor is increased continuously or stepwisely from a circumferential intermediate portion of the rotor facing end face toward circumferential end portions thereof.

20 Claims, 24 Drawing Sheets

ELECTRIC ROTATING MACHINE

CROSS-REFERENCE TO RELATED APPLICATIONS

This application claims priority under 35 U.S.C. §119 to Japanese Patent Application No. 2012-178049 filed on Aug. 10, 2012, the entire disclosure of which is incorporated herein by reference in its entirety.

BACKGROUND OF THE INVENTION

1. Field of the Invention

The present invention relates to, inter alia, an electric rotating machine, and more specifically relates to an electric rotating machine preferably used as an electric motor as a driving source for various electric vehicles including electric motorcycles and various electric machines.

2. Description of the Related Art

The following description sets forth related art and problems therein and should not be construed as an admission of knowledge in the prior art.

Conventionally, electric vehicles, such as, e.g., electric motorcycles, are equipped with an electric motor as a driving source. Further, various electric devices, such as, e.g., DVDs, are also equipped with an electric motor as a driving source. An electric rotating machine such as an electric motor includes a rotor and a stator. The rotor includes a permanent magnet and is configured to rotate about a rotation axis. The stator includes stator windings and is arranged so as to face the rotor via a gap in a radial direction of the rotor.

In recent years, it has been desired that an electric motor used as a driving source of various electric vehicles including electric motorcycles may be small in size and high in performance. In the case of a vehicle equipped with an internal combustion engine, a transmission is normally used. In the case of electric motors of this kind, however, if the operational range from a high torque low speed revolution speed range to a low torque high speed revolution speed range is wide, a driving force appropriate for a vehicle operation can be obtained without using a transmission.

In an electric motor, however, due to the inherent characteristics, a high torque can be generated in a low revolution speed range. In an electric motor, however, the upper limit of the revolution speed will be limited in a high revolution speed range. That is, in an electric motor, a high torque can be generated in a low revolution speed range. However, as the revolution speed increases, the induced voltage (e.g., back electromotive force), which is to be generated at the stator winding arranged on the stator by magnetic flux of the permanent magnet provided at the rotor, increases. When the revolution speed increases and reaches a certain speed, the induced voltage induced at the stator winding becomes equal to the applied voltage of the electric motor, preventing the electric current flow in the stator winding. This in turn prevents a further increase of the revolution speed. To solve this problem, for example, a field weakening control, which decreases the induced voltage (e.g., back electromotive force), is employed.

In the field weakening control, a current to negate the induced voltage is supplied to the stator winding. In the case of an electric motor in which an electric power is supplied from the outside, the increased power consumption does not result in a shortened drivable time. Therefore, in such an electric motor, even if such a field weakening control is employed, there will be no problem. However, in the case of an electric motorcycle, no power is supplied thereto from the outside, and the electric motorcycle is driven only by a power supplied from a battery mounted thereon. In such a vehicle, the battery capacity is limited. Therefore, when the electric current is supplied to negate the induced voltage induced in the stator winding, the electric power consumption increases. This results in a shortened drivable time. For this reason, it is requested to decrease the power consumption as much as possible.

Herein is proposed a new stator structure capable of being replaced with a conventional field weakening control which induces additional power consumption (see Japanese Unexamined Laid-open Patent Application Publication No. 2006-191782). In this proposal, a tooth portion of a stator on which a winding is arranged is divided into at least two divided tooth portions. The at least two divided tooth portions are relatively movable. The relative movement of the at least two divided tooth portions causes magnetic flux flow changes, which decreases the influence on the stator winding by the flux of the permanent magnet of the rotor at the time of a high revolution speed. According to this proposal, the flux linkage of the stator winding at the time of a high revolution speed can be adjusted by a physical means. Therefore, the electrical power conventionally used for the field weakening control can be decreased or eliminated, which enabled to provide an electric rotating machine capable of decreasing power consumption.

In such an electric rotating machine of this type, it is desired to further enlarge the operational range from a high torque low revolution speed range to a low torque high revolution speed range.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments of the present invention can provide an electric rotating machine capable of further enlarging the operational range from a high torque low revolution speed range to a low torque high revolution speed range.

Among other potential advantages, some embodiments of the present invention can provide a radial gap type electric rotating machine in which, even if a permanent magnet having a strong magnetic force is used as a permanent magnet for a rotor, the operational range can be enlarged from a high torque low revolution speed range to a low torque high revolution speed range and the possible Joule loss can be reduced.

Other objects and advantages of the present invention will be apparent from the following preferred embodiments.

According to some embodiments of the present invention, an electric rotating machine is provided with a rotor having a plurality of permanent magnets arranged on an outer peripheral portion of a rotor main body and a stator arranged radially outward of the rotor main body.

The stator includes a plurality of tooth portions arranged at predetermined intervals in a circumferential direction of the rotor, a stator yoke portion arranged outside of the plurality of tooth portions, and a magnetic resistance changing mechanism configured to change a magnetic resistance of a stator magnetic path constituted by the stator yoke portion and each of the plurality of tooth portions by mechanically changing the stator magnetic path.

Each of the plurality of tooth portions includes a pair of side protruded portions protruded from both sides of a rotor side end portion of each of the plurality of tooth portions in the circumferential direction.

A magnetic resistance of a magnetic path formed by a gap between a pair of adjacent side protruded portions of a pair of adjacent tooth portions is set to have a value so that a) when the magnetic resistance changing mechanism is in a first state in which the stator magnetic path is changed so that the magnetic resistance of the stator magnetic path is minimum or near minimum, a main magnetic path that extends from one of the magnetic poles of one of a pair of adjacent permanent magnets is formed by a magnetic path mainly passing through the pair of adjacent tooth portions corresponding to the pair of adjacent permanent magnets and the stator yoke portion, and b) when the magnetic resistance changing mechanism is in a second state in which the stator magnetic path is changed so that the magnetic resistance of the stator magnetic path is maximum or near maximum, the main magnetic path is formed by a magnetic short-path mainly passing through a rotor side end portion of the tooth portion.

Furthermore, in a first relative position in which adjacent end portions of the pair of adjacent permanent magnets are positioned corresponding to a circumferential intermediate portion of the rotor side end portion of each tooth portion, a first magnetic short-circuit C1 is defined as a magnetic short-circuit C constituting a magnetic short-path mainly passing through the circumferential intermediate portion.

In a second relative position in which adjacent end portions of the pair of adjacent permanent magnets are positioned corresponding to one of circumferential end portions of the rotor side end portion of each tooth portion, a second magnetic short-circuit C2 is defined as a magnetic short-circuit C constituting a magnetic short-path mainly passing through the one of circumferential end portions.

In a third relative position in which adjacent end portions of the pair of adjacent permanent magnets are positioned corresponding to a pair of adjacent side protruded portions, a third magnetic short-circuit C3 is defined as a magnetic short-circuit C constituting a magnetic short-path mainly passing through the gap between the pair of adjacent side protruded portions.

When the magnetic resistance changing mechanism is in the second state, the second magnetic short-circuit C2 has a total magnetic resistance between a total magnetic resistance of the first magnetic short-circuit C1 and a total magnetic resistance of the third magnetic short-circuit C3, and is configured to control a change ratio of the total magnetic resistance of the magnetic short-circuit C when the magnetic short-circuit C is changed from the second magnetic short-circuit C2 to the third magnetic short-circuit C3 and from the third magnetic short-circuit C3 to the second magnetic short-circuit C2 in accordance with a relative rotational movement of the rotor with respect to the stator.

In some exemplary embodiments of the electric rotating machine, it can be configured such that both end portions of a rotor facing end face of the rotor side end portion of each tooth portion in the circumferential direction are positioned between a first virtual curve A and a second virtual curve B. The first virtual curve A is a curve having a curvature radius R0 centering on a rotation axis of the rotor and passing a rotor closest portion of the rotor facing end face which is closest to an outer periphery of the rotor. The second virtual curve B is a curve having a curvature having the same curvature radius R0 as the curvature radius R0 of the first virtual curve A and contacting the first virtual curve A at the rotor closest portion of the rotor facing end face, the second virtual curve B being convex toward the outer periphery of the rotor.

In some exemplary embodiments of the electric rotating machine, it can be configured such that the rotor facing end face of the rotor side end portion of each tooth portion is formed into a concave curve in cross-section which is concave toward the outer periphery of the rotor, the concave curve having a curvature radius larger than the curvature radius R0 of the first virtual curve A.

In some exemplary embodiments of the electric rotating machine, it can be configured such that the rotor facing end face of the rotor side end portion of each tooth portion is formed into a cross-sectional shape in which a gap between the rotor facing end face of the rotor side end portion of each tooth portion and the outer periphery of the rotor is increased continuously or step-wisely from a circumferential intermediate portion of the rotor facing end face toward a circumferential end portion of the rotor facing end face.

In some exemplary embodiments of the electric rotating machine, it can be configured such that the rotor facing end face of the rotor side end portion of each tooth portion is formed into an angular cross-sectional shape having an obtuse angle, the cross-sectional shape being convex toward the outer periphery of the rotor.

In some exemplary embodiments of the electric rotating machine, it can be configured such that each tooth portion is divided into a plurality of divided tooth portions in the radial direction, the plurality of divided tooth portions including a first divided tooth portion arranged at an innermost portion in the radial direction and facing an outer peripheral portion of the rotor main body and a second divided tooth portion arranged at an outermost portion in the radial direction and connected to the stator yoke portion. At least one of the plurality of divided tooth portions in each tooth portion constitutes a movable divided tooth portion relatively movable in the circumferential direction with respect to the other divided tooth portion, and the movable divided tooth portion is movable between a first position and a second position, the first position and the second position being relatively different in magnetic resistance of a magnetic path formed by the plurality of divided tooth portions in each tooth portion.

In some exemplary embodiments of the electric rotating machine, it can be configured such that each tooth portion is divided into two divided tooth portions in the radial direction, the two divided tooth portions including a first divided tooth portion arranged so as to face the outer peripheral portion of the rotor main body and a second divided tooth portion arranged outside of the first divided tooth portion in the radial direction via a gap.

In some exemplary embodiments of the electric rotating machine, it can be configured such that the first position is defined as a magnetic resistance minimum position in which the plurality of divided tooth portions are aligned in the radial direction so that a magnetic resistance of a magnetic path constituted by the plurality of divided tooth portions becomes minimum. The second position is defined as a magnetic resistance maximum position in which the movable divided tooth portion is relatively moved with respect to the other divided tooth portion in the circumferential direction so that the magnetic resistance of the magnetic path constituted by the plurality of divided tooth portions becomes maximum. The movable divided tooth portion is relatively movable continuously or discontinuously within arbitrary positions between the magnetic resistance minimum position and the magnetic resistance maximum position.

In some exemplary embodiments of the electric rotating machine, it can be configured such that the permanent magnet is a neodymium magnet.

In some exemplary embodiments of the electric rotating machine, it can be configured such that the plurality of permanent magnets are arranged in the outer peripheral portion of the rotor main body in an embedded manner.

In some exemplary embodiments of the electric rotating machine, it can be configured such that the plurality of permanent magnets are arranged on the outer peripheral portion of the rotor main body in an outwardly exposed manner.

According to other embodiments of the present invention, a vehicle is equipped with the electric rotating machine as mentioned above.

According to still other embodiments of the present invention, an electronic product is equipped with the electric rotating machine as mentioned above.

According to some preferred embodiments of the present invention, when the magnetic resistance changing mechanism is in the second state in which the stator magnetic path is changed so that the magnetic resistance value of the stator magnetic path is the maximum value or close to it, the second magnetic short-circuit C2 functions as a buffer circuit that controls the change ratio in the total magnetic resistance value of the magnetic short-circuit C in accordance with the revolution of the rotor. Therefore, it is possible to provide an electric rotating machine capable of controlling the peak value of the induced voltage induced on the stator winding and further enlarging the operational range by extending the upper limit of the revolution speed in a high revolution speed range even if the rotor rotates at a high speed in the second state.

Also, by employing the mechanical magnetic resistance changing mechanism, an electric rotating machine capable of decreasing or eliminating the electric power for a conventional field weakening control can be provided. Furthermore, even in the case of using a permanent magnet having a strong magnetic force, high torque can be obtained in a low revolution speed range, and the upper limit of the revolution speed in the high revolution speed range and the operational range can be enlarged.

In addition, because the change in magnetic flux of the rotor during high speed revolution in the second state can be controlled, it becomes possible to provide an electric rotating machine that can control the decrease in efficiency, the decrease in the magnetic coercive force and residual magnetic flux density of the permanent magnet caused by the heat generation due to the Joule loss, and the decrease in efficiency of the electric motor by decreasing the occurrence of a Joule loss generated in the permanent magnet.

BRIEF EXPLANATION OF THE DRAWINGS

The preferred embodiments of the present invention are shown by way of example, and not limitation, in the accompanying figures, in which:

FIG. 6 is an explanatory cross-sectional view showing the vicinity of the rotor side end portion of the tooth portion of the stator and the peripheral portion of the rotor and the vicinity thereof, wherein FIG. 6(A) shows a magnetic short-circuit C1 in a first relative position in which adjacent end portions of a pair of adjacent permanent magnets are arranged at a circumferential intermediate portion of the rotor side end portion of the tooth portion, FIG. 6(B) shows a magnetic short-circuit C2 in a second relative position in which the rotor is rotated in the circumferential direction from the first relative position and the adjacent end portions of the permanent magnets are arranged at a circumferential one end portion side of the rotor side end portion of the tooth portion, and FIG. 6(C) shows the magnetic short-circuit C3 in a third relative position in which the rotor is further rotated in the circumferential direction from the second relative position and the adjacent end portions of the permanent magnets are arranged corresponding to the pair of adjacent side protruded portions;

FIG. 11 is an explanatory cross-sectional view of the vicinity of the rotor side end portion of the tooth portion of the stator of the aforementioned comparative example, wherein FIG. 11(A) shows a magnetic short-circuit C1 in a first relative position in which adjacent end portions of a pair of adjacent permanent magnets are arranged at the circumferential intermediate portion of the rotor side end portion of the tooth portion, FIG. 11(B) shows a magnetic short-circuit C2 in a second relative position in which the rotor is rotated in the circumferential direction from the first relative position and the adjacent end portions of the permanent magnets are arranged at a circumferential one end portion side of the rotor side end portion of the tooth portion, FIG. 11(C) shows a magnetic short-circuit C3 in a third relative position in which the rotor is further rotated in the circumferential direction from the second relative position and the adjacent end portions of the permanent magnets are arranged corresponding to the pair of adjacent side protruded portions, and FIG. 11(D) shows a magnetic short-circuit C2 in the second relative position in which the rotor is further rotated in the circumferential direction from the third relative position and the adjacent end portions of the permanent magnets are arranged at a circumferential one end portion side of side protruded portions of the rotor side end portions of the adjacent tooth portion;

DETAILED DESCRIPTION OF THE PREFERRED EMBODIMENTS

In the following paragraphs, some preferred embodiments of the present invention will be described with reference to the attached drawings by way of example and not limitation. It should be understood based on this disclosure that various other modifications can be made by those in the art based on these illustrated embodiments.

Figure 14:
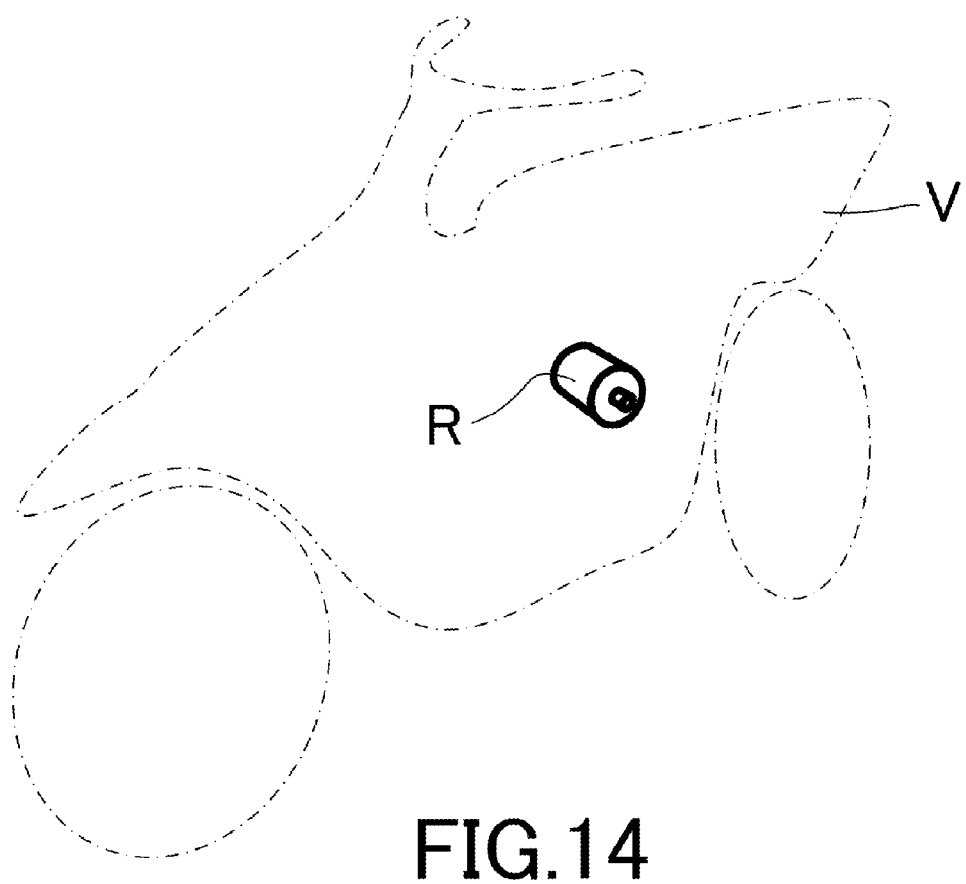
FIG. 14 is a view schematically showing a vehicle equipped with the electric rotating machine according to an embodiment of the present invention.
Figure 15:
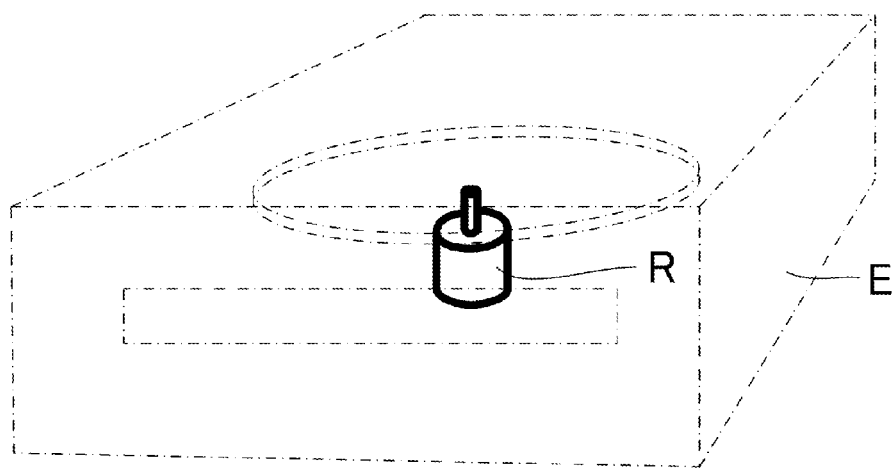
FIG. 15 is a view schematically showing an electric product equipped with the electric rotating machine according to an embodiment of the present invention.

An electric motor as an electric rotating machine according to an embodiment of the present invention is suitably used for a main driving source or an auxiliary driving source in a variety of vehicles V including, e.g., electric motorcycles and other vehicles (see FIG. 14). An electric motor of this kind typically has high torque at a low revolution speed and low torque at a high revolution speed. The electric rotating machine according to the present invention, however, is not limited for use in these vehicles, but can also suitably be used for, for example, an electric motor R as a driving force in electric products E including household electronics, such as, e.g., washing machines, etc., and office automation devices, such as, e.g., DVD players, etc. (see FIG. 15).

Initially, the development process of the present invention will be explained. In the market, an even higher-performance electric rotating machine is desired. Therefore, it was attempted to further improve the performance by employing a permanent magnet piece having a stronger magnetic force, such as, e.g., a neodymium magnet. In detail, in a radial gap type electric rotating machine, a variety of research and studies were initially conducted to use a permanent magnet having a stronger magnetic force.

Figure 10A:
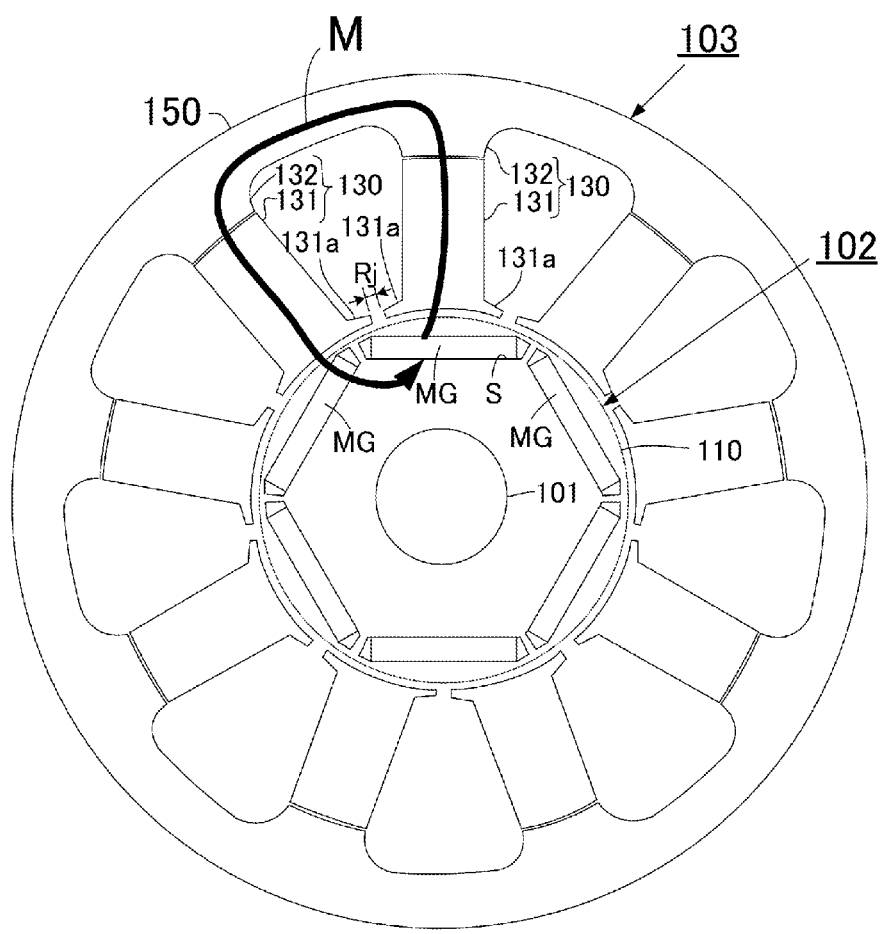
FIG. 10A is a cross-sectional view corresponding to FIG. 4A and showing a comparative example.
Figure 10B:
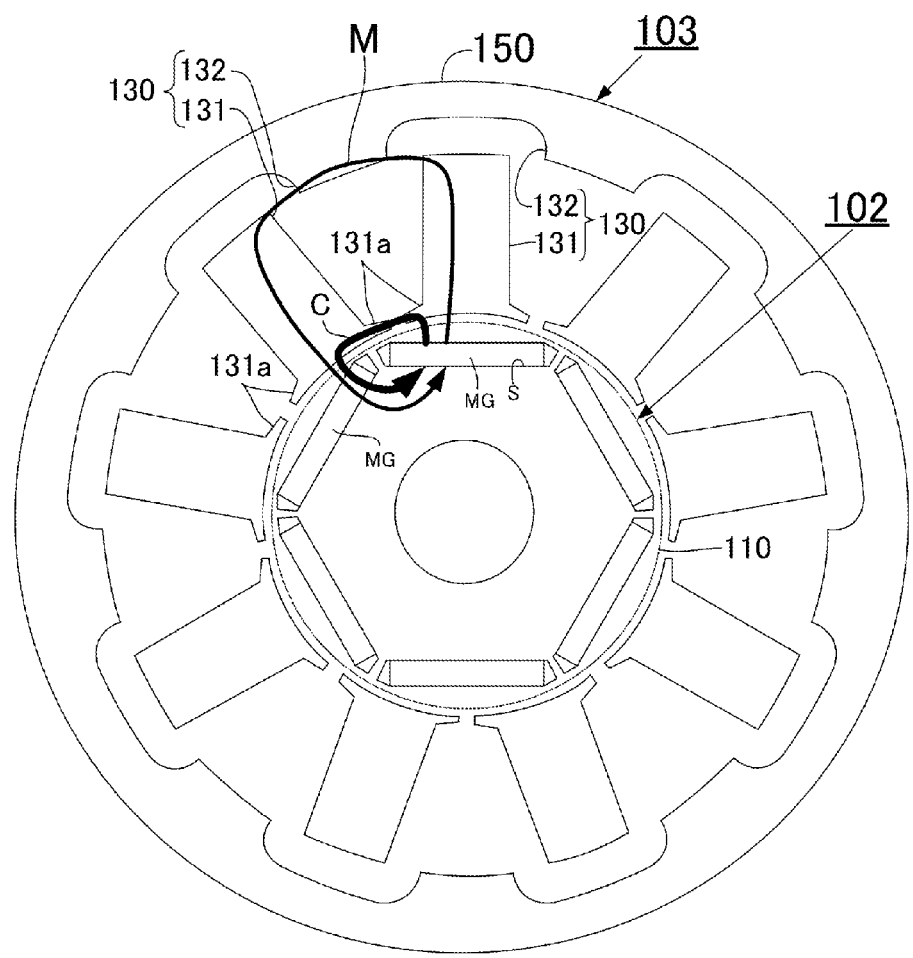
FIG. 10B is a cross-sectional view corresponding to FIG. 4B and showing the aforementioned comparative example.

Specifically, an improved radial gap type electric rotating machine was proposed as shown in FIGS. 10A and 10B.

This radial gap type electric rotating machine includes a rotor 102 and a stator 103. The rotor 102 includes a cylindrical rotor main body 110 configured to rotate about a rotation shaft 101 and a plurality of permanent magnet pieces MG embedded in an outer peripheral portion of the cylindrical rotor main body 110 and arranged at constant intervals in a circumferential direction of the rotor main body 110. The stator 103 is formed into a cylindrical shape. The stator 103 is arranged radially outward of the rotor 102 so as to face an outer peripheral surface of the rotor 102 via a gap. More specifically, this electric rotating machine has the following structure.

The permanent magnet piece MG is formed into a rectangular cross-sectional plate shape extending in an axial direction. The permanent magnet piece MG is fixed to the outer peripheral portion of the rotor main body 110 in a state in which the permanent magnet piece MG is fitted in a slit S having a corresponding cross-sectional shape and formed radially inward of the outer peripheral surface of the rotor main body 110 so as to be positioned inwardly by a predetermined distance. Therefore, even if the rotor main body 110 rotates at a high revolution speed about the rotation shaft 101, the permanent magnet piece MG does not break loose radially outward due to the centrifugal force.

The stator 103 is arranged radially outward of the rotor 102 and coaxially with the rotor 102 so as to face the outer periphery of the rotor 102 via a predetermined gap. The stator 103 includes a plurality of tooth portions 130 arranged at constant intervals in the circumferential direction of the rotor 102 in a state in which the stator 103 is arranged radially outward of the rotor 102 via the gap.

Each tooth portion 130 is divided into two divided tooth portions in a radial direction at a position of the tooth portion 130 closer to an end portion of the tooth portion 130 opposite to a rotor side end portion of the tooth portion 130. In detail, each tooth portion 130 includes two divided tooth portions, e.g., a first tooth portion 131 arranged closer to the rotor side and a second tooth portion 132 arranged outside of the first tooth portion 131. The first tooth portion 131 and the second tooth portion 132 are arranged in a relatively movable manner in the circumferential direction with a predetermined gap formed therebetween.

In each first tooth portion 131, a rotor facing end face of the rotor side end portion is formed into an arc shape corresponding to the outer peripheral shape of the rotor 102 (e.g., formed to have a constant gap in the circumferential direction). Side protruded portions 131a and 131a extending in the circumferential direction are integrally formed on both circumferential side portions of the rotor side end portion. Each first tooth portion 131 is provided with a winding (not illustrated).

The second tooth portion 132 as a movable divided tooth portion is configured such that the relative position of the second tooth portion 132 relative to the first tooth portion 131 can be continuously changed between the first position shown in FIG. 10A and the second position shown in FIG. 10B. The first position denotes a position in which the first tooth portion 131 and the second tooth portion 132 are arranged in a radially aligned manner as shown in FIG. 10A. The second position denotes a position in which the second tooth portion 132 is located at an intermediate position between the pair of adjacent first tooth portions 131 and 131 as shown in FIG. 10B.

When the second tooth portion 132 is in the first position shown in FIG. 10A, the magnetic flux from one of adjacent permanent magnet pieces MG reaches the other of adjacent permanent magnet pieces MG via the following path. That is, the magnetic flux from one of adjacent permanent magnet pieces MG reaches the other of adjacent permanent magnet pieces MG mainly through a magnetic circuit constituted by a pair of adjacent tooth portions 130 and the stator yoke portion 150. This magnetic circuit is defined as a main magnetic circuit M.

On the other hand, as shown in FIG. 10B, when the second tooth portion 132 is in the second position, the magnetic flux from one of adjacent permanent magnet pieces MG reaches the other of adjacent permanent magnet pieces MG via the following path. That is, the magnetic flux from one of adjacent permanent magnet pieces MG reaches the other of adjacent permanent magnet pieces MG mainly through a magnetic circuit constituted by a gap between the adjacent side protruded portions 131a and 131a of the adjacent tooth portions 130. This magnetic circuit is defined as a magnetic short-circuit C.

In a state in which the second tooth portion 132 is in the second position, the magnetic short-circuit C as a main magnet circuit is formed at the rotor side end portion of the stator 103. Therefore, even if the rotor 102 rotates at a high revolution speed, it was thought that the induced voltage induced to the stator winding will be suppressed, which enables an increased number of revolution of the rotor 102.

Under the circumstances, for the aforementioned electric motor, a simulation analysis was conducted while moving the second tooth portion 132 as a movable divided tooth portion in the circumferential direction to change its relative position relative to the first tooth portion 131. As a result, it was confirmed that, by moving the second tooth portion 132 as a movable divided tooth portion relative to the first tooth portion 131, the upper limit of the high revolution speed range can be increased, which in turn can enlarge the operational range without using an electric power associated with a conventional field weakening control.

For the purpose of further extending the upper limit of the high revolution speed range to enlarge the operational range, further experiments and research were conducted. The experiments and research focused attention on the shape of the rotor side end portion of each tooth portion 130 of the stator 103. As a result, it was found that by changing the shape of the rotor side end portion of each tooth portion 130 of the stator 103, the operational range can be enlarged by extending the upper limit of the high revolution speed range, and completed the present invention.

That is, in the improved electrical rotating machine according to the aforementioned proposal, when the magnetic resistance between the first tooth portion 131 and the second tooth portion 132 becomes large by moving the movable divided tooth portion 132 (second tooth portion) in the circumferential direction, the influence by the magnetic short-circuit C becomes large. In other words, the magnetic flux of the adjacent permanent magnet pieces MG mainly passes through the rotor side end portion of the stator 103.

Therefore, it was thought that the cross-sectional shape of the rotor facing end face of the rotor side end portion of the first tooth portion 131 of the stator 103 was preferably formed into a cross-sectional shape corresponding to the shape of the outer periphery of the rotor main body 110. That is, it was thought that the gap between the rotor facing end surface of the first tooth portion 131 and the outer periphery of the rotor main body 110 should be preferably formed to be constant in the circumferential direction and that the gap should be decreased as small as possible.

However, further experiments and research revealed that when the rotor side end portion of each tooth portion 130 of the stator 103 is formed into a shape as mentioned above, the upper limit of the high revolution speed range becomes rather restricted.

Figure 11:
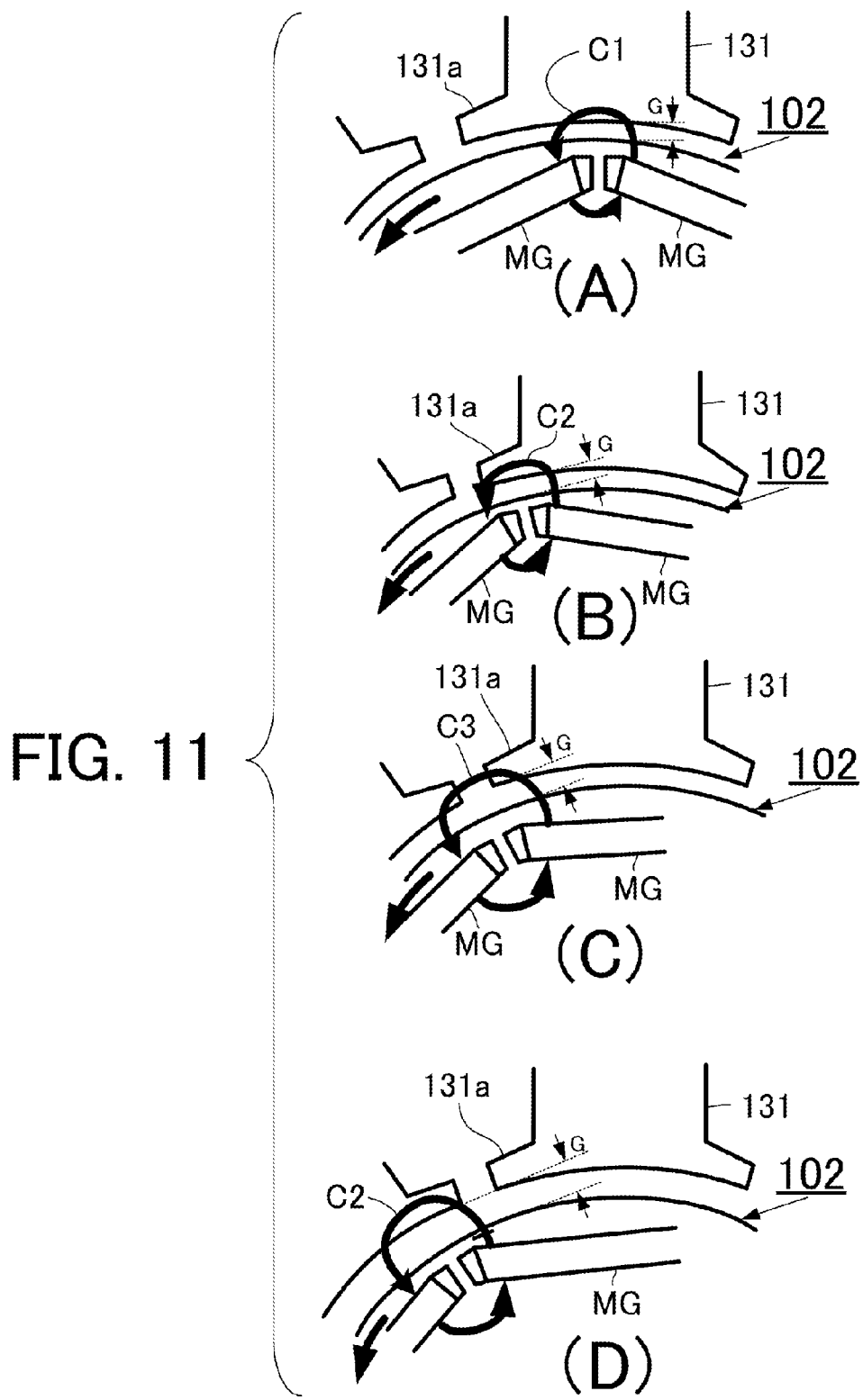

It is initially assumed that the magnetic resistance between the first tooth portion 131 and the second tooth portion 132 has become large by moving the movable divided tooth portion (second tooth portion) 132 in the circumferential direction as shown in FIG. 10B. In this state, as shown in FIG. 11(A), when the adjacent end portions of the adjacent permanent magnet pieces MG and MG of the rotor 102 are positioned at the intermediate portion of the first tooth portion 131 of the stator 103 in the circumferential direction, the magnetic short-circuit C1 is constituted by a path mainly passing through the circumferential intermediate portion of the rotor side end portion of the tooth portion (first tooth portion 131). From this state, it is assumed that the rotor 102 rotates in a counterclockwise direction and the adjacent end portions of the adjacent permanent magnet pieces MG and MG of the rotor 102 are positioned at the left end portion of the first tooth portion 131 of the stator 103 in the circumferential direction as shown in FIG. 11(B). Also in this state, in the same way as in the state shown in FIG. 11(A), the magnetic short-circuit C2 is constituted by a path mainly passing through one end portion (side protruded portion) of the rotor side end portion of the tooth portion (first tooth portion 131). Therefore, even if the state changes from the state shown in FIG. 11(A) to the state shown in FIG. 11(B), the gap G between the rotor side end portion of the tooth portion (first tooth portion 131) of the stator 103 and the outer periphery of the rotor main body 110 is constant, and therefore there is no big change in the magnetic resistance between the magnetic short-circuit C1 and the magnetic short-circuit C2.

However, when the rotor 102 further rotates in the counterclockwise direction from the state shown in FIG. 11(B), the magnetic short-circuit C3 is constituted by a path mainly passing through the gap between the adjacent side protruded portions 131a and 131a of the adjacent first tooth portion 131 and 131. In this state, because the gap between the adjacent side protruded portions 131a constitutes a part of the magnetic short-circuit C, the total magnetic resistance of the magnetic short-circuit C3 becomes larger as compared with the states shown in FIG. 11(A) and FIG. 11(B).

When the rotor 102 further rotates in the counterclockwise direction from the state shown in FIG. 11(C), the magnetic short-circuit C is again constituted by a path passing through the rotor side end portion (side protruded portion 131a) of the tooth portion 131 of the stator 103. Therefore, the total magnetic resistance of the magnetic short-circuit C2 becomes the same value as the state shown in FIG. 11(B), which is smaller as compared with the total magnetic resistance of the state shown in FIG. 11(C).

In this way, especially when the state changes from the state shown in FIG. 11(B) to the state shown in FIG. 11(C) and when the state changes from the state shown in FIG. 11(C) to the state shown in FIG. 11(D), the total magnetic resistance of the magnetic short-circuit C changes largely and suddenly. In accordance with the large and sudden change of the magnetic resistance of the magnetic short-circuit C, the number of magnetic flux of the permanent magnet pieces MG and MG of the rotor 102 interlinked with the stator winding changes largely and suddenly. Consequently, the peak value of the induced voltage induced to the stator winding increases in accordance with the large and sudden change in the interlinking magnetic flux number. This prevents further increase in number of revolution of the rotor 102.

It was confirmed that decreasing the change ratio of the magnetic resistance of the magnetic short-circuit by devising the shape of the rotor side end portion of each tooth portion 130 of the stator 103 can decrease the induced voltage to be induced to the stator winding, which in turn can increase the number of revolution of the rotor 102, and completed the present invention. Hereinafter, the present invention will be explained in detail based on specific embodiments.

First Embodiment

FIGS. 1 to 6 schematically show a radial gap type electric motor preferably used as an electric motor for electric motorcycles according to a first embodiment of the present invention. As shown in these figures, the radial gap type motor includes a columnar rotor 2, a cylindrical stator 3 and a rotating mechanism 4 as main components. The columnar rotor 2 has a plurality of permanent magnet pieces MG arranged at an outer peripheral portion at certain intervals in a circumferential direction and is configured to rotate about a rotation shaft 1. The cylindrical stator 3 is arranged radially outward of the outer peripheral portion of the rotor 2 via a gap so as to face the outer peripheral portion. The rotating mechanism 4 is configured to relatively move a movable divided tooth portion 32 constituting the stator 3, which will be explained later.

Figure 2:
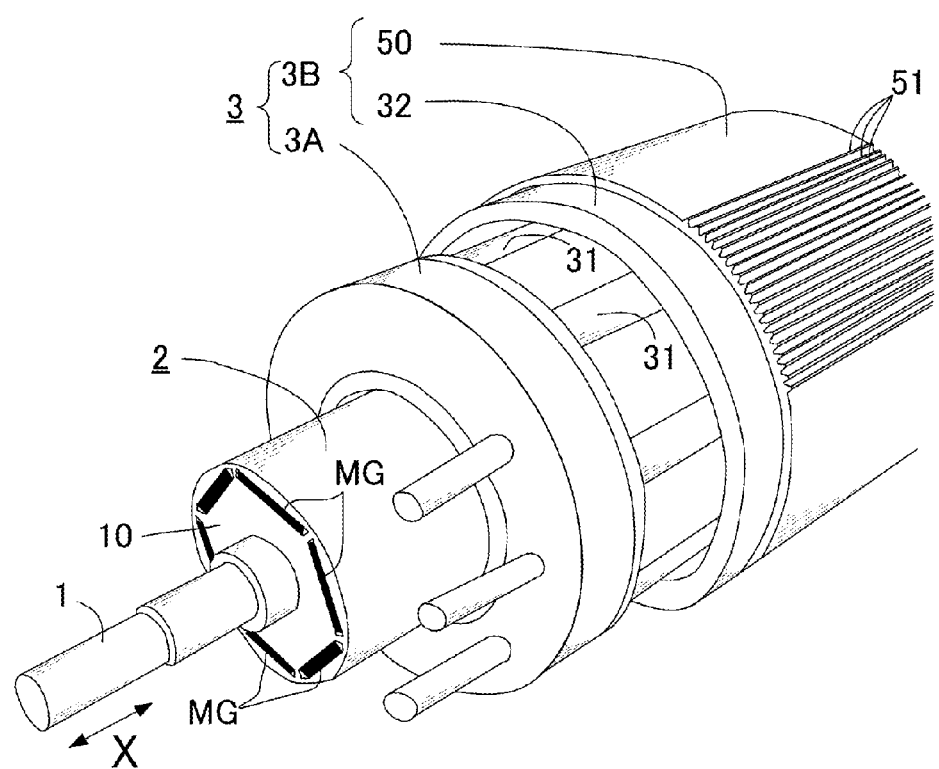
FIG. 2 is a perspective view showing the main structural members of the electric rotating machine in a sequentially pulled out manner in the axial direction.

As shown in FIG. 2, the rotor 2 includes a cylindrical rotor main body 10 having the rotation shaft 1 arranged at the axial center thereof. A total of six plate shaped permanent magnet pieces MG each having a rectangular cross-sectional shape are arranged in the circumferential direction of the rotor 2 at constant intervals in the outer peripheral portion of the rotor main body 10.

As the permanent magnet piece MG, a magnet, such as, e.g., a neodymium magnet, which creates a strong magnetic force, can be preferably used. It was found that especially when using a permanent magnet having a strong magnetic force, depending on the shape and/or arrangement of the permanent magnet piece MG, the rotor 2, and the stator 3, Joule losses occur in the permanent magnet piece MG to increase the temperature of the permanent magnet, piece MG which largely deteriorates the efficiency of the motor and furthermore the coercive force of the permanent magnet is decreased, which causes deterioration of the motor's performance. These problems are not limited in the case of using a permanent magnet having a strong magnetic force, and can occur in varying degrees in the case of using a conventional permanent magnet having a normal magnetic force. In the rotating electric motor according to some embodiments of the present invention, the aforementioned problems are solved by the newly proposed structure which will be mentioned later.

Figure 3:
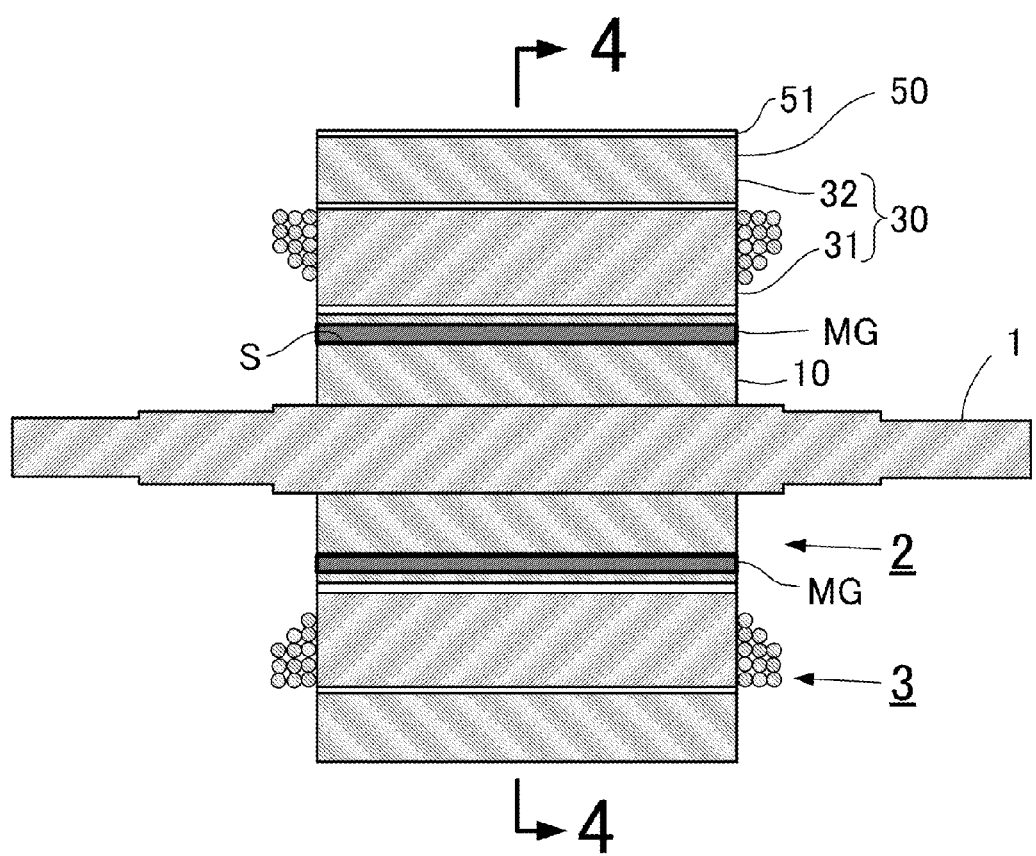
FIG. 3 is a cross-sectional view showing the rotor and the stator of the electric rotating machine.

As shown in FIG. 2, the permanent magnet piece MG is formed into a plate shape rectangular in cross-section extending along the axial direction X. As shown in FIG. 3, each permanent magnet piece MG is embedded in and fixed to a slit S having a corresponding cross-sectional shape and formed in the outer peripheral portion of the rotor main body 10 at a position radially inward of the outer peripheral surface by a predetermined distance. Therefore, even if the rotor main body 10 rotates at a high revolution speed about the rotation shaft 1, the permanent magnet piece MG does not break loose to the outside in the radial direction due to the centrifugal force since the permanent magnet piece MG is fixedly fitted in the slit S.

Figure 4A:
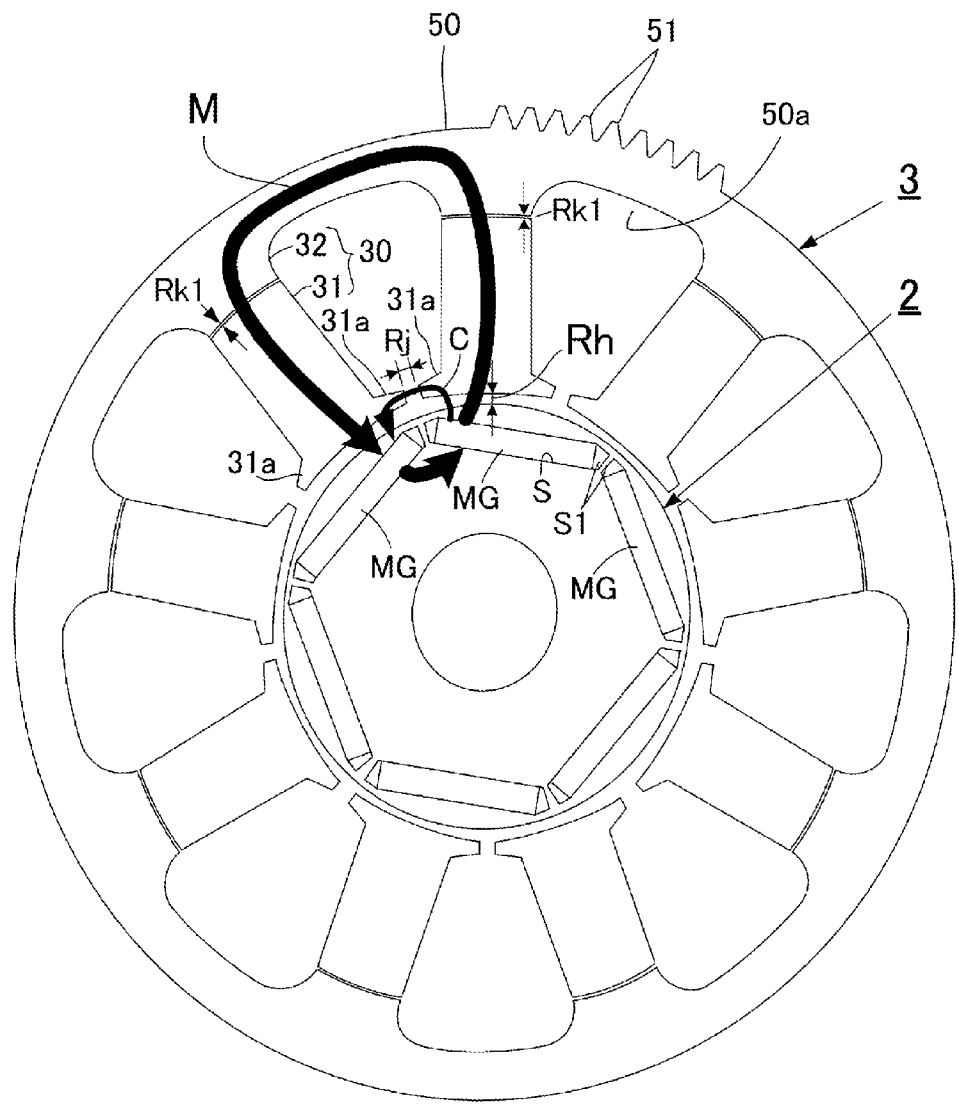
FIG. 4A is an enlarged cross-sectional view taken along the line 4-4 in FIG. 3 and showing a state (first state) in which the second tooth portion is in a first position in which the first tooth portion and the second tooth portion are arranged in a radially aligned manner.

The width dimension of the slit S is, as shown in FIG. 4A for example, formed to be slightly larger than the width dimension of the permanent magnet piece MG. In a state in which the permanent magnet piece MG is fitted in the slit S, an air gap S1 is formed at both ends of the permanent magnet piece MG to constitute a flux barrier.

The rotor main body 10 is formed by, for example, bonding a plurality of thin silicon steel plates, each formed into a predetermined shape by a punching process, in the axial direction X, so that possible eddy-current loss to be generated due to changes in magnetic flux in the rotor main body 10 can be reduced. This is the same for the stator 3 and the stator yoke portion 50 which will be mentioned later.

The stator 3 is arranged coaxially with the rotor 2 and arranged radially outward of the rotor 2 via a predetermined gap so as to face the rotor 2. As shown in FIG. 2, the stator 3 includes a cylindrical first stator portion 3A coaxially arranged with the rotor 2 via a predetermined gap and arranged outside of the outer periphery of the rotor 2, and a cylindrical second stator portion 3B coaxially arranged with the rotor 2 and radially outward of the first stator portion 3A via a predetermined gap in a state in which the second stator portion 3B is movable in the circumferential direction relative to the first stator portion 3A.

The stator 3 includes, as shown in FIG. 4A, a plurality of tooth portions 30 arranged at predetermined intervals along the circumferential direction of the rotor 2 in a state in which they are arranged radially outward of the rotor 2 with the gap therebetween. Each tooth portion 30 is divided, at a portion closer to an end portion opposite to a rotor side end portion, into two divided tooth portions in the radial direction, e.g., a first tooth portion 31 arranged closer to the rotor side and a second tooth portion 32 arranged outside of the first tooth portion 31.

The first tooth portion 31 and the second tooth portion 32 are arranged via a predetermined gap so that both the tooth portions 31 and 32 can be relatively movable in the circumferential direction. The gap between the first tooth portion 31 and the second tooth portion 32 is set to be smaller than the gap between the rotor side end face of the first tooth portion 31 and the outer periphery of the rotor 2. That is, as shown in FIG. 4A, in a state in which the first tooth portion 31 and the second tooth portion 32 are arranged in the radially aligned manner, the magnetic resistance Rk1 between the first tooth portion 31 and the second tooth portion 32 is smaller than the minimum magnetic resistant Rh between the rotor side end face of the first tooth portion 31 and the outer periphery of the rotor 2.

Figure 5:
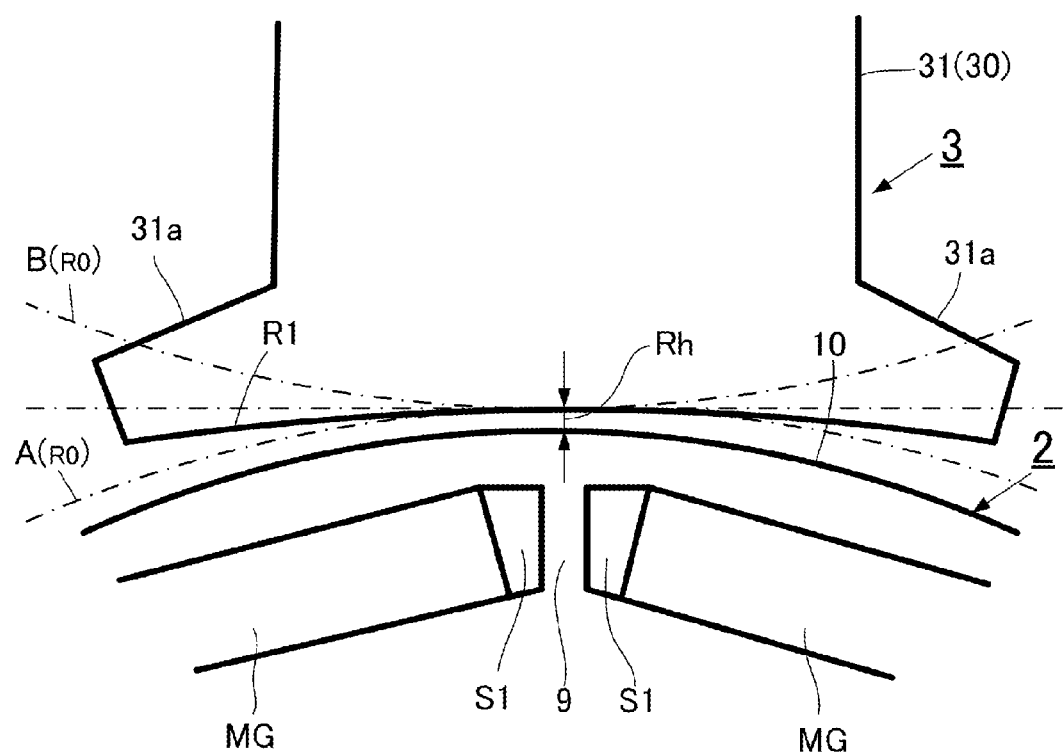
FIG. 5 is an enlarged cross-sectional view showing the vicinity of the rotor side end of the tooth portion.
Figure 6:
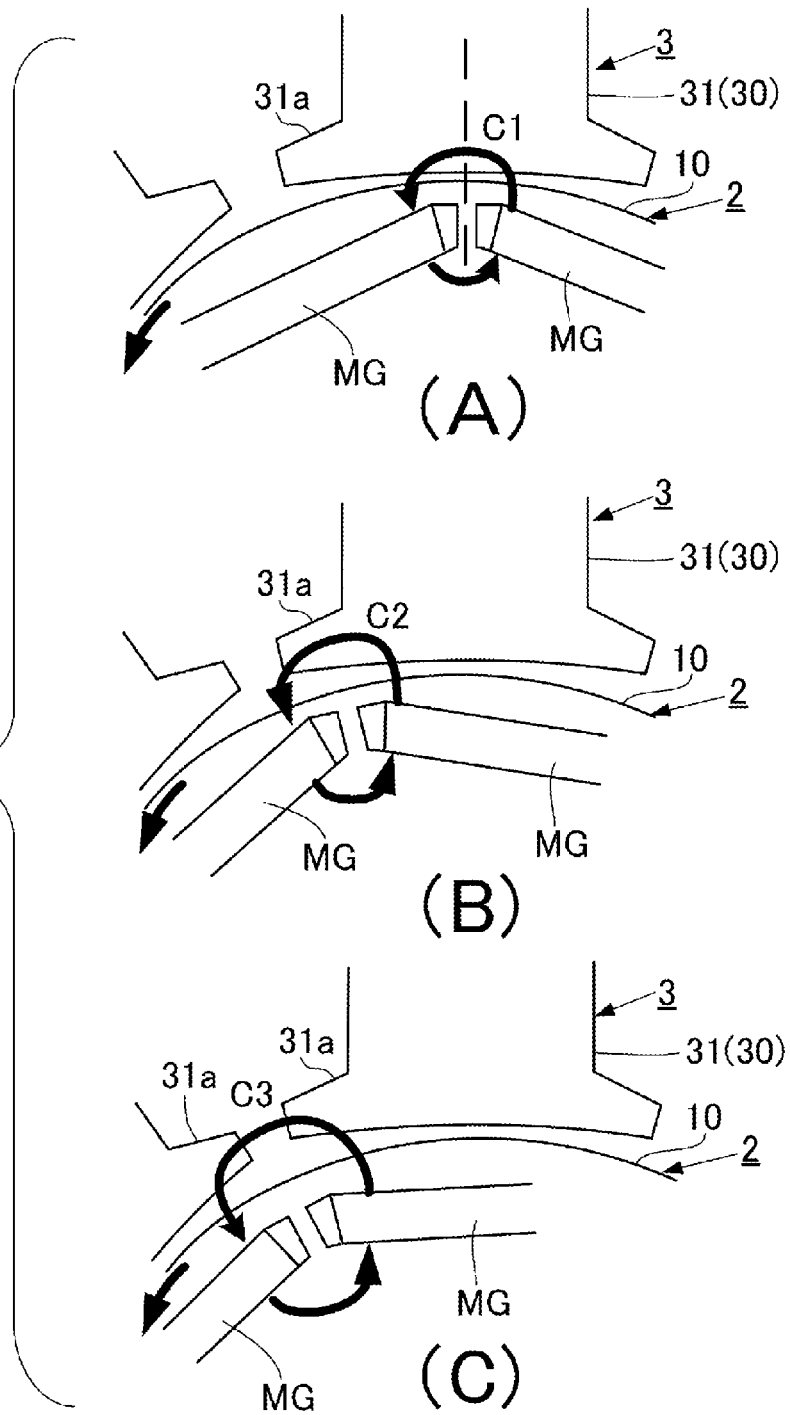

Each first tooth portion 31 is formed, as shown in FIG. 5 in an enlarged manner, so that the rotor facing end face of the rotor side end portion is formed into a circular arc cross-sectional shape concaving toward the rotor 2 and having a curvature radius R1 larger than the curvature radius of the outer periphery of the rotor 2. Specifically, the rotor facing end face of the rotor side end portion of the first tooth portion 31 is positioned between a first virtual curve A and a second virtual curve B. The first virtual curve A is defined as a curve having a curvature radius R0 centering on a rotation axis of the rotor 2 and passing a rotor closest portion of the rotor facing end face which is closest to an outer periphery of the rotor 2. The second virtual curve B is defined as a curve having a curvature having the same curvature radius as the curvature radius R0 of the first virtual curve A and contacting the first virtual curve A at the rotor closest portion of the rotor facing end face. The second virtual curve B is convex toward the outer periphery of the rotor 2. At both side portions of the rotor side end portion of the first tooth portion 31 in the circumferential direction, side protruded portions 31a and 31a are integrally formed so as to extend in the circumferential direction.

The gap between the side protruded portions 31a and 31a of adjacent first tooth portions 31 and 31 is set to be larger than the gap between the first tooth portion 31 and the second tooth portion 32, as shown in FIG. 4A. Specifically, the gap between the adjacent side protruded portions 31a and 31a of the adjacent tooth portions 30 and 30 is set so that the magnetic resistance Rj between the adjacent side protruded portions 31a and 31a of the adjacent first tooth portions 31 and 31 is larger than the magnetic resistance 2Rk1, which is two times the magnetic resistance Rk1 between the first tooth portion 31 and the second tooth portion 32 in a state in which the first tooth portion 31 and the second tooth portion 32 are arranged in the radially aligned manner (see FIG. 4A).

Figure 1:
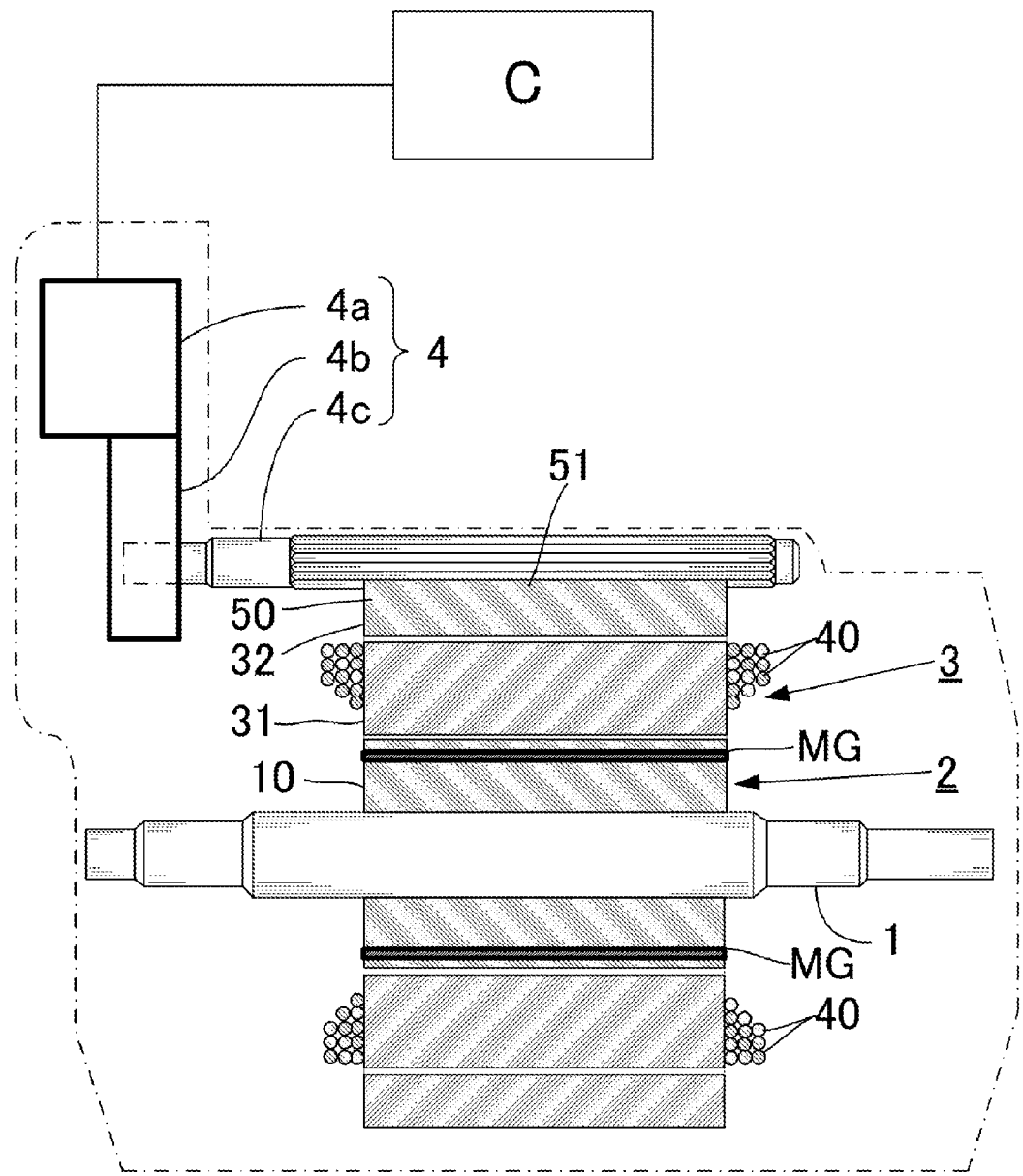
FIG. 1 is a cross-sectional view schematically showing a structure of an electric rotating machine according to a first embodiment of the present invention.

As shown in FIG. 1, each first tooth portion 31 is provided with a winding 40. As shown in FIG. 2, a plurality of first tooth portions 31 having the winding 40 constitute a cylindrical first stator portion 3A molded with resin. The winding 40 can be a single winding or a plurality of separate and independent windings. In this embodiment, a single winding is employed.

The second tooth portion 32 is, as shown in FIG. 4A, formed integrally with the stator yoke portion 50 in a manner such that the second tooth portion 32 is inwardly protruded from the inner peripheral surface of the cylindrical stator yoke portion 50, and arranged corresponding to the first tooth portion 31. In this embodiment, the second tooth portion 32 is an integral structure with the stator yoke portion 50, but it can be configured such that the second tooth portion 32 is formed separately from the stator yoke portion 50 and connected and fixed to the stator yoke portion 50. As shown in FIG. 2, the second tooth portion 32 and the stator yoke portion 50 constitute a cylindrical second stator portion 3B.

On the outer peripheral surface of the stator yoke portion 50 constituting the second stator portion 3B, as shown in FIG. 2, on the partial region of the outer peripheral surface in the circumferential direction, a gear portion 51 having a plurality of teeth is formed along the entire length in the longitudinal direction of the stator yoke portion 50. As shown in FIG. 1, the gear portion 51 is engaged with a wheel gear 4c which is rotary driven by a drive motor 4a of the rotating mechanism 4 via the speed reduction mechanism 4b.

The drive motor 4a is configured to rotate in both opposite directions by a controller C. The rotational force of the drive motor 4a is transmitted to the wheel gear 4c via the speed reduction mechanism 4b. The rotation of the wheel gear 4c is transmitted to the gear portion 51 of the stator yoke portion 50 (second stator portion 3B) to cause a relative movement of the second stator portion 3B with respect to the first stator portion 3A in the circumferential direction. This in turn causes a relative movement of the second tooth portion 32 with respect to the first tooth portion 31 within a certain range in the circumferential direction. In this way, by controlling the drive motor 4a, the relative position of the first tooth portion 31 and the second tooth portion 32 can be arbitrarily and continuously or discontinuously changed.

Figure 4B:
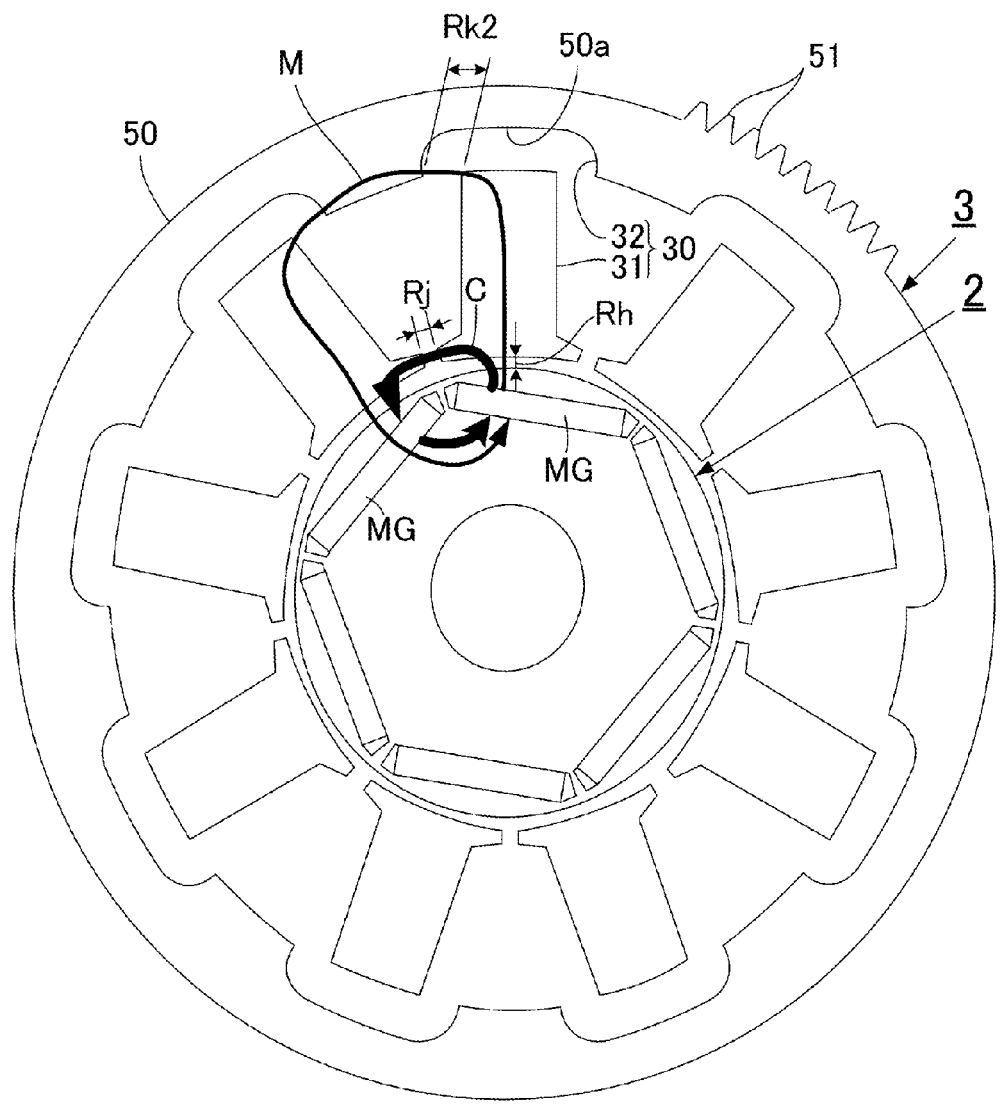
FIG. 4B is a cross-sectional view corresponding to FIG. 4A, showing a state (second state) in which the second tooth portion is in a second position in which the second tooth portion is relatively moved with respect to the first tooth portion.

By controlling the drive motor 4a with the controller C, the relative position of the second tooth portion 32 as a movable divided tooth portion with respect to the first tooth portion 31 can be freely changed continuously or discontinuously between a magnetic resistance minimum position as shown in FIG. 4A and a magnetic resistance maximum position as shown in FIG. 4B. The magnetic resistance minimum position is defined as a position in which the first tooth portion 31 and the second tooth portion 32 are arranged in a radially aligned manner and the magnetic resistance Rk of the magnetic path formed by the first tooth portion 31 and the second tooth portion 32 becomes minimum Rk1. On the other hand, the magnetic resistance maximum position is defined as a position in which the second tooth portion 32 is positioned in between a pair of adjacent first tooth portions 31 and 31 and the magnetic resistance Rk of the magnetic path formed by the first tooth portion 31 and the second tooth portion 32 becomes maximum Rk2.

When the magnetic resistance minimum position as shown in FIG. 4A is defined as a first position and the magnetic resistance maximum position as shown in FIG. 4B is defined as a second position, the movable divided tooth portion (the second tooth portion 32) is controlled by the controller C so that the movable divided tooth portion moves between the first position and the second position.

In the present invention, it is not the case that the first position and the second position exactly correspond to the magnetic resistance minimum position and the magnetic resistance maximum position, respectively. For example, in the present invention, it can be configured such that two arbitrary positions between the magnetic resistance minimum position and the magnetic resistance maximum position are defined as the first position and the second position, respectively, and that the movable divided tooth portion (second tooth portion) 32 is moved between the first position and the second position.

In this embodiment, a tooth portion 30 which is divided into two portions in the radial direction is exemplified, but the present invention is not limited to that. In the present invention, the tooth portion 30 can be divided into, for example, three or more portions in the radial direction. When the tooth portion 30 is divided into three or more portions, the divided tooth portion arranged closest to the rotor 2 is defined as the first tooth portion 31, and the divided tooth portion arranged at the radially outermost side is defined as the second tooth portion 32. In cases where the tooth portion is divided into three or more divided tooth portions, it can be configured such that at least one of the plurality of divided tooth portions constitutes a movable divided tooth portion relatively movable with respect to the other divided tooth portions so that the magnetic resistance of the magnetic path formed by the divided tooth portions is adjustable by the relative movement of the movable divided tooth portion.

In this embodiment, the explanation is made such that each tooth portion is divided into the first tooth portion 31 and the second tooth portion 32, but the structure can be understood as follows. That is, it can be understood such that the first tooth portion 31 constitutes a tooth portion 30; the second tooth portion 32 and the stator yoke portion 50 constitute a stator yoke portion; a concave portion 50a is formed on the inner peripheral surface of the stator yoke portion 50; and the stator yoke portion 50 is relatively movable with respect to the tooth portion (first tooth portion 31) in the circumferential direction. In that case, it is understood that the tooth portion 30 has a structure in which the tooth portion 30 is not divided in the radial direction. The present invention can have any other structure as long as the stator magnetic path formed by a stator yoke portion 50 and tooth portions 30 and 30 is mechanically changed so that the magnetic resistance value of the stator magnetic path can be changed. For example, one example of a modified magnetic resistance changing mechanism includes a mechanism in which a magnetic gap is provided at a part of the stator yoke portion 50 so that the magnetic gap can be adjusted.

In the first state in which the second tooth portion 32 as a movable divided tooth portion is arranged in the first position, it is configured to satisfy the following relational expression (see FIG. 4A):

(the total magnetic resistance ($2Rh+2Rk1$) of the main magnetic circuit $M$)<(the total magnetic resistance ($2Rh+Rj$) of the magnetic short-circuit $C$.

In the aforementioned relational expression, Rh denotes a magnetic resistance between the rotor facing end face of the first tooth portion 31 and the outer peripheral surface of the rotor 2, Rk1 denotes a magnetic resistance between the first tooth portion 31 and the second tooth portion 32, and Rj is a magnetic resistance between the adjacent side protruded portions 31a and 31a.

Also, in a state in which the second tooth portion 32 as a movable divided tooth portion is arranged in the second position, it is configured to satisfy both the following relational expressions (see FIG. 4B):

(total magnetic resistance of the third magnetic short-circuit $C3$)<(total magnetic resistance of the main magnetic circuit $M$), and (the total magnetic resistance ($2Rh+Rj$) of the magnetic short-circuit $C$)<(the total magnetic resistance ($2Rh+2Rk2$) of the main magnetic circuit $M$).

In the aforementioned relational expression, Rh denotes a magnetic resistance between the rotor facing end face of the first tooth portion 31 and the outer peripheral surface of the rotor 2, Rk2 denotes a magnetic resistance between the first tooth portion 31 and the second tooth portion 32, and Rj denotes a magnetic resistance between the adjacent side protruded portions 31a and 31a. The main magnetic circuit M and the magnetic short-circuit C are defined as follows.

As shown in FIG. 4A, the main magnetic circuit M is defined as a magnetic circuit having a main magnetic path which extends from one of magnetic poles (radially outward magnetic pole in the drawing) of one of adjacent permanent magnet pieces MG and MG and reaches the other of magnetic poles (radially inward magnetic pole in the drawing) of the one of adjacent permanent magnet pieces MG and MG via one of the tooth portions 30 of the adjacent tooth portions 30 and 30, the stator yoke portion 50, the other of one of the tooth portions 30 of the adjacent tooth portions 30 and 30, and the other of adjacent permanent magnet pieces MG and MG.

On the other hand, when the movable divided tooth portion 32 is moved in a clockwise direction to take the second position between the adjacent first tooth portions 31 and 31 as shown in FIG. 4B, the main magnetic circuit M is defined as follows. That is, the main magnetic circuit M is a magnetic circuit having a main magnetic path which extends from one of magnetic poles of adjacent permanent magnet pieces MG and MG and reaches the other of magnetic poles of the adjacent permanent magnet pieces MG and MG via the following portions in turn. The main magnetic path extends through the first tooth portion 31 of one of adjacent tooth portions 30 and 30, a stator yoke portion side end portion of the first tooth portion 31, and then an end portion of the second tooth portion 32 corresponding to the stator yoke portion side end portion of the first tooth portion 31. Thereafter, the main magnetic paths extends through the second tooth portion 32, an opposite end portion of the second tooth portion 32, a stator yoke portion side end portion of the first tooth portion 31 of the other of adjacent tooth portions 30 and 30, the first tooth portion 31 of the other of adjacent tooth portions 30 and 30, and then the other of the adjacent permanent magnet pieces MG and MG.

Needless to say, regardless of the position of the second tooth portion 32, the magnetic flux of the permanent magnet piece MG passes various paths other than the aforementioned path, e.g., a path between adjacent first tooth portions 31 and 31, as a leakage flux. In the present invention, a magnetic circuit is defined based on a main magnetic flux path. It should be understood that this interpretation is applied not only to the main magnetic circuit M but also to the magnetic short-circuit C.

As shown in FIGS. 4A and 4B, the magnetic short-circuit C is defined as a magnetic circuit having a main magnetic path which extends from one of magnetic poles of one of adjacent permanent magnet pieces MG and MG and reaches the other of magnetic poles of one of the adjacent permanent magnet pieces MG and MG, mainly via the rotor side end portion side of the tooth portion 30.

As shown in FIGS. 4A and 4B, when adjacent end portions of the adjacent permanent magnet pieces MG and MG are in a position corresponding to the adjacent side protruded portions 31a and 31a of the adjacent first tooth portions 31 and 31, the magnetic short-circuit C is defined as a magnetic circuit having a magnetic main path as follows. That is, the magnetic short-circuit C is defined as a magnetic circuit having a main magnetic path which extends from one of magnetic poles of one of adjacent permanent magnet pieces MG and MG and reaches the other of magnet poles of the one of adjacent permanent magnet pieces MG and MG via the following portions in turn. The main magnetic path extends through a rotor side end portion of the first tooth portion 31 of the one of adjacent tooth portions 30 and 30, and then one of side protruded portions 31a of the rotor side end portion of the first tooth portion 31 of the one of adjacent tooth portions 30 and 30. Thereafter, the main magnetic path extends through a side protruded portion 31a of a rotor side end portion of a first tooth portion 31 of the other of adjacent tooth portions 30 and 30, which is adjacent to the one of side protruded portions 31a, a rotor side end portion of the first tooth portion 31 of the other of adjacent tooth portions 30 and 30, and then the other of adjacent permanent magnetics MG and MG.

As explained above, the magnetic path of the magnetic short-circuit C differs slightly depending on the relative position of the permanent magnet piece MG of the rotor 2 and the first tooth portion 31 of the stator 3. As mentioned above, however, the magnetic short-circuit C is defined as a magnetic circuit having a main magnetic path which extends from one of magnetic poles of one of adjacent permanent magnet pieces MG and MG and reaches the other of magnetic poles of one of the adjacent permanent magnets via the other of adjacent permanent magnet pieces MG and MG, without passing through a radially outward portion of the tooth portion 30 excluding the rotor side end portion and the side protruded portions 31a and 31a of the first tooth portion 31.

In the electric motor according to this embodiment, when the rotor 2 rotates, the flow of the magnetic flux from one of magnetic poles of the permanent magnet piece MG to the other of magnetic poles differs between when the second tooth portion 32 is in the first position in which the second tooth portion 32 as a movable divided tooth portion and the first tooth portion 31 are arranged in a radially aligned manner (see FIG. 4A) and when the second tooth portion 32 is in the second position in which the second tooth portion 32 is moved relative to the first tooth portion 31 (see FIG. 4B).

First, the flow of the magnetic flux which exits from one of magnetic poles of the permanent magnet piece MG and reaches the other of magnetic poles when the rotor 2 rotates in a state in which the second tooth portion 32 as a movable divided tooth portion is in the first position in which the second tooth portion 32 and the first tooth portion 31 are arranged in a radially aligned manner (see FIG. 4A) will be explained.

In this state, as explained above, the following relational expression is satisfied: (the total magnetic resistance (2Rh+2Rk1) of the main magnetic circuit M)<(the total magnetic resistance (2Rh+Rj) of the magnetic short-circuit C). In this state, regardless of the rotational position of the rotor 2, the total magnetic resistance (2Rh+2Rk1) of the main magnetic circuit MG is small. Therefore, the majority of the magnetic flux exited from one of magnetic poles (e.g., the upper magnetic pole in FIG. 4A) of the permanent magnet piece MG (the right permanent magnet piece MG shown in FIG. 4A) returns to the other of magnetic poles (the lower magnetic pole shown in FIG. 4A) via the following magnetic path.

Focusing attention on the right permanent magnet piece MG shown in FIG. 4A, the magnetic flux from one of magnetic poles (the upper magnetic pole in FIG. 4A) of the permanent magnet piece MG returns to the other of magnetic poles (the lower magnetic pole in FIG. 4A) via the first tooth portion 31 of one of adjacent tooth portions 30 and 30 (the tooth portion 30 positioned in the middle in FIG. 4A), the second tooth portion 32 radially outwardly aligned with the first tooth portion 31, the stator yoke portion 50, the second tooth portion 32 of the other of adjacent tooth portions 30 and 30 (the tooth portion 30 positioned on the left side in FIG. 4A), the first tooth portion 31 of the other of adjacent tooth portions 30 and 30 (the tooth portion 30 positioned on the left side in FIG. 4A) radially inwardly aligned with the second tooth portion 32, and the permanent magnet pieces MG arranged on the left side.

Obviously, other than the aforementioned path, leakage flux exists between the adjacent tooth portions 30 and 30, especially between the side protruded portions 31a and 31a of the adjacent first tooth portions 31 and 31. However, the magnetic resistance between the adjacent tooth portions 30 and 30 and the magnetic resistance between the side protruded portions 31a and 31a are significantly larger than the magnetic resistance (2Rk1) of the main magnetic circuit, and therefore the leakage flux does not largely exert an influence on the flow of the magnetic flux of the main magnetic circuit M. Further, on each of both widthwise ends of the permanent magnet pieces MG, a connection wall 9 connecting the upper iron core portion and the lower iron core portion is integrally formed (for example, see FIG. 5). Although magnetic flux flow always exists in the connection wall 9, the magnetic flux flow is saturated and stable. Therefore, the magnetic flux flow does not largely exert an influence on the magnetic flux flow of the main magnetic circuit M.

Therefore, when the rotor 2 rotates in a state in which the second tooth portion 32 as a movable divided tooth portion is in the first position in which the second tooth portion 32 and the first tooth portion 31 are arranged in a radially aligned manner (see FIG. 4A), the flow of the magnetic flux which exits from one of magnetic poles of the permanent magnet piece MG and reaches the other of magnetic poles is stable. Therefore, the change of the magnetic flux in the permanent magnet piece MG is small. As a result, Joule losses generated in the permanent magnet piece MG are also small.

Next, the flow of the magnetic flux which exits from one of magnetic poles of the permanent magnet piece MG and reaches the other of magnetic poles when the rotor 2 rotates in a state in which the second tooth portion 32 as a movable divided tooth portion is moved relative to the first tooth portion 31 and is in the second position (see FIG. 4B) will be explained.

In this state, as explained above, the following relational expression is satisfied:

> (the total magnetic resistance (2Rh+Rj) of the magnetic short-circuit M)<(the total magnetic resistance (2Rh+2Rk2) of the main magnetic circuit M).

In this second positional state, regardless of the rotational position of the rotor 2, the total magnetic resistance (2Rh+Rj) of the magnetic short-circuit C is smaller than the total magnetic resistance (2Rh+2Rk2) of the main magnetic circuit M. Therefore, the majority of the magnetic flux exited from one of magnetic poles (the upper side magnetic pole in FIG. 4B) of the permanent magnet M (the center permanent magnet piece MG in FIG. 4B) returns to the other of magnetic poles (the lower side magnetic pole in FIG. 4B) via the path of the magnetic short-circuit C.

In this embodiment, as shown in FIG. 5, the rotor facing end face of the rotor side end portion of each tooth portion 30 (first tooth portion 31) is formed into a concave shape facing the rotor main body and having a curvature radius R1. The curvature radius R1 is larger than a curvature radius R0 of a first virtual curved line A centering on the rotation axis of the rotor 2 and passing through the closest portion of the rotor facing end face positioned closest to the outer peripheral surface of the rotor 2.

That is, in this shape, the gap between the tooth portion 30 (first tooth portion 31) and the rotor 2 (rotor main body 10) gradually increases continuously from the circumferential intermediate portion toward the circumferential end portions of the rotor facing end face of the tooth portion 30. In other words, the magnetic resistance Rh between the tooth portion 30 and the rotor 2 is gradually increased continuously from the circumferential intermediate portion to the circumferential end portions. It should be noted that the shape of the rotor facing end face of the rotor side end portion of the tooth portion 30 (first tooth portion 31) is not limited to be changed continuously and gradually as in this embodiment, and can be changed discontinuously or step-wisely.

In this embodiment, as shown in FIG. 4B, in the second state in which the magnetic resistance between the first tooth portion 31 and the second tooth portion 32 has become larger by moving the movable divided tooth portion (second tooth portion) 32 in the circumferential direction, when the adjacent end portions of the adjacent permanent magnet pieces MG and MG of the rotor 2 take a first relative position in which the adjacent end portions are positioned at the circumferential intermediate portion of the tooth portion 30 of the stator 3 as shown in FIG. 6A, the magnetic short-circuit C1 is a path passing through the circumferential intermediate portion of the rotor side end portion of the tooth portion 30 (first tooth portion 31). From this state, when the rotor 2 is rotated in the counterclockwise direction and the adjacent end portions of the adjacent permanent magnet pieces MG and MG of the rotor 2 take a second relative position in which the adjacent end portions are located at the circumferential left end portion of the tooth portion 31 of the stator 3 as shown in FIG. 6(B), in the same manner as in the state shown in FIG. 6(A), the magnetic short-circuit C2 is constituted by a path mainly passing through one end portion (side protruded portion) 31a of the rotor side end portion of the tooth portion 30 (first tooth portion 31). Therefore, when it changes from the state shown in FIG. 6(A) to the state shown in FIG. 6(B), although the gap G between the rotor side end portion of the tooth portion 30 (first tooth portion 31) of the stator 3 and the outer periphery of the rotor main body 10 slightly enlarges, there is no sudden and large change in the magnetic resistance between the magnetic short-circuit C1 and the magnetic short-circuit C2.

Next, when the rotor 2 is further rotated in the counterclockwise direction from the state shown in FIG. 6(B), the magnetic short-circuit C3 is constituted by a path mainly passing through the gap between the adjacent side protruded portions 31a and 31a of the adjacent first tooth portions 31 and 31. In this third relative position, because the gap between the adjacent side protruded portions 31a and 31a constitute a part of the magnetic short-circuit C3, the total magnetic resistance of the magnetic short-circuit C3 becomes larger as compared with the states shown in FIG. 6(A) and FIG. 6(B).

In other words, the second magnetic short-circuit C2 has a total magnetic resistance value between the total magnetic resistance value of the first magnetic short-circuit C1 and the total magnetic resistance value of the third magnetic short-circuit C3. This functions as a buffer circuit for controlling the rate of change in the total magnetic resistance value of the magnetic short-circuit C at the time of changing the magnetic short-circuit C from the second magnetic short-circuit C2 to the third magnetic short-circuit C3 and from the third magnetic short-circuit C3 to the second magnetic short-circuit C2 in accordance with the relative rotational movement of the rotor 2 with respect the stator 3.

That is, in the case of a comparative example in which the rotor facing end face of the rotor side end portion of each tooth portion 30 (first tooth portion 31) has a curved surface corresponding to the outer peripheral surface of the rotor main body 10 in which the gap is formed to be constant along the circumferential direction (see FIGS. 10A and 10B), there is no big difference in the total magnetic resistance between the first magnetic short-circuit C1 and the magnetic short-circuit C2, but there is a big difference in the total magnetic resistance between the second magnetic short-circuit C2 and third magnetic short-circuit C3. Therefore, when the rotor 2 rotates in the circumferential direction, due to the change in the relative position of the rotor 2 with respect to each tooth portion 30, the magnetic short-circuit C changes from the first magnetic short-circuit C1 to the second magnetic short-circuit C2, and to the third magnetic short-circuit C3. In accordance with the change, the magnetic resistance changes suddenly when the magnetic short-circuit changes from the second magnetic short-circuit C2 to the magnetic short-circuit C3 and from the third magnetic short-circuit C3 to the second magnetic short-circuit C2. This in turn causes changes of the number of magnetic flux interlinked with the stator winding of the permanent magnet piece MG, resulting in an increased peak value of the induced voltage induced to the stator winding. For this reason, the upper limit of the number of revolutions of the rotor 2 is limited.

On the other hand, in this embodiment, as explained above, the rotor facing end face of the rotor side end portion of each tooth portion 30 (first tooth portion 31) is formed into a curved surface having a curvature radius slightly larger than the curvature radius of a curved surface corresponding to the outer peripheral surface of the rotor main body 10. Therefore, the total magnetic resistance of the second magnetic short-circuit C2 is larger than the total magnetic resistance of the first magnetic short-circuit C1. Further, the second magnetic short-circuit C2 has a total magnetic resistance value between the total magnetic resistance value of the first magnetic short-circuit C1 and the total magnetic resistance of the third magnetic short-circuit C3. Therefore, when the magnetic short-circuit C changes from the second magnetic short-circuit C2 to the third magnetic short-circuit C3 and from the third magnetic short-circuit C3 to the second magnetic short-circuit C2, the change ratio of the magnetic resistance becomes smaller than the aforementioned comparative example. This changes the number of magnetic flux interlinked with the stator winding of the permanent magnet piece MG, resulting in a reduced peak value of the induced voltage induced to the stator winding as compared with the comparative example. For this reason, as compared with the comparative example, the upper limit of the number of revolutions of the rotor 2 can further be increased.

In addition, in the first embodiment, both circumferential end portions of the rotor facing end face of the rotor side end portion of each tooth portion 30 are, as shown in FIG. 5, positioned between the first virtual curve A and the second virtual curve B in the cross-sectional view. The first virtual curve A has a curvature radius R0 centering on a rotation axis of the rotor 2 and passing a rotor closest portion of the rotor facing end face which is closest to the outer periphery of the rotor 2 (circumferential intermediate portion in this embodiment). The second virtual curve B has the same curvature radius R0 as the curvature radius R0 of the first virtual curve A and contacts the first virtual curve A at the rotor closest portion of the rotor facing end face. The second virtual curve B is convex toward the outer periphery of the rotor (see FIG. 5).

Second Embodiment

An electric rotating machine according to a second embodiment of the present invention is a radial gap type electric motor preferably used as an electric motor for an electric motorcycle, as similar to the first embodiment. This radial gap type electric motor of this second embodiment is almost the same in basic structure as the electric motor of the first embodiment.

Figure 7:
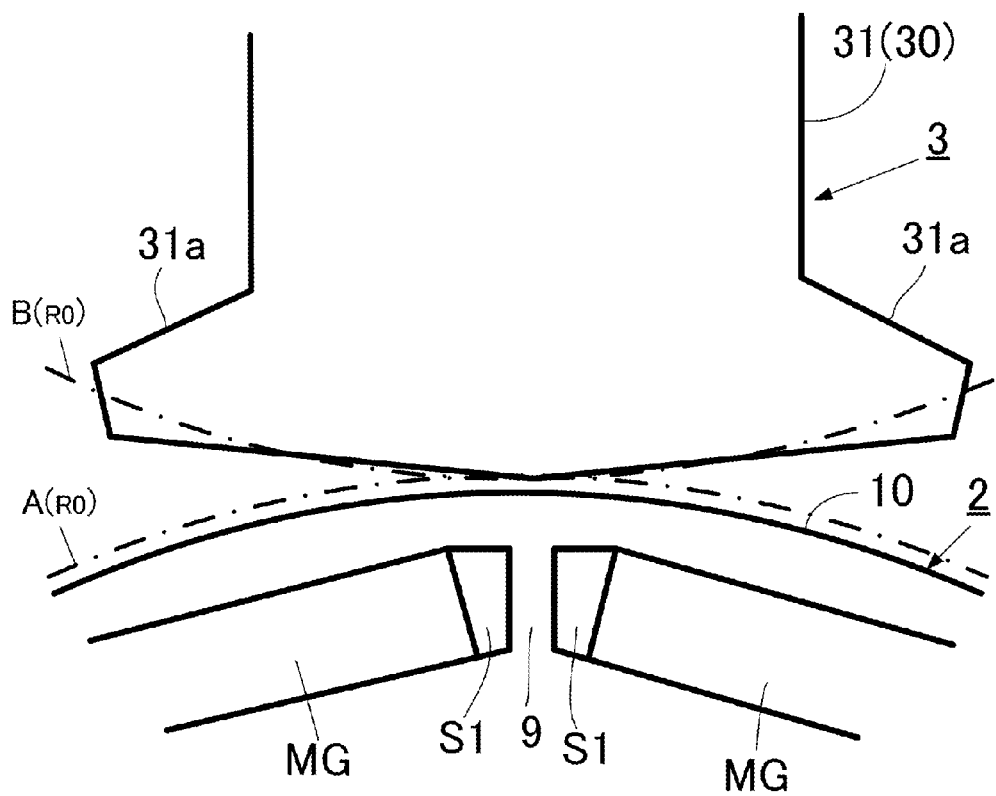
FIG. 7 is an enlarged cross-sectional view corresponding to FIG. 5 and showing a second embodiment of the present invention.

In this second embodiment, as shown in FIG. 7, the rotor facing end face of the rotor side end portion of each tooth portion 30 (first tooth portion 31) is formed into an arrow-like cross-sectional shape overall having an obtuse angle which is convex toward the outer periphery of the rotor 2 (rotor main body 10). In this embodiment, the total magnetic resistance of the second magnetic short-circuit C2 is larger than the total magnetic resistance of the first magnetic short-circuit C1. Also, the second magnetic short-circuit C2 has a total magnetic resistance value between the total magnetic resistance of the first magnetic short-circuit C1 and the total magnetic resistance of the third magnetic short-circuit C3. Therefore, in this embodiment, when the magnetic short-circuit C changes from the second magnetic short-circuit C2 to the third magnetic short-circuit C3 and from the third magnetic short-circuit C3 to the second magnetic short-circuit C2, the change ratio of the magnetic resistance is smaller than in the comparative example. This changes the number of magnetic flux interlinked with the stator winding of the permanent magnet piece MG, resulting in a reduced peak value of the induced voltage induced to the stator winding as compared with the comparative example. Therefore, as compared with the comparative example, the upper limit of the number of revolutions of the rotor 2 can be further increased. Since the other structures are the same as those of the first embodiment, the explanations thereof will be omitted.

Also in this second embodiment, both circumferential end portions of the rotor facing end face of the rotor side end portion of each tooth portion 30 are positioned between the first virtual curve A and the second virtual curve B in the cross-sectional shape. The first virtual curve A has a curvature radius R0 centering on a rotation axis of the rotor 2 and passing a rotor closest portion of the rotor facing end face which is closest to the outer periphery of the rotor 2 (circumferential intermediate portion in this embodiment). The second virtual curve B has the same curvature radius R0 as the curvature radius R0 of the first virtual curve A and contacts the first virtual curve A at the rotor closest portion of the rotor facing end face. The second virtual curve B is convex toward the outer periphery of the rotor (see FIG. 7).

Third Embodiment

An electric rotating machine according to a third embodiment of the present invention is a radial gap type electric motor preferably used as an electric motor for an electric motorcycle, as similar to the first embodiment. This radial gap type electric motor of this third embodiment is almost the same in basic structure as the electric motor of the first embodiment.

Figure 8:
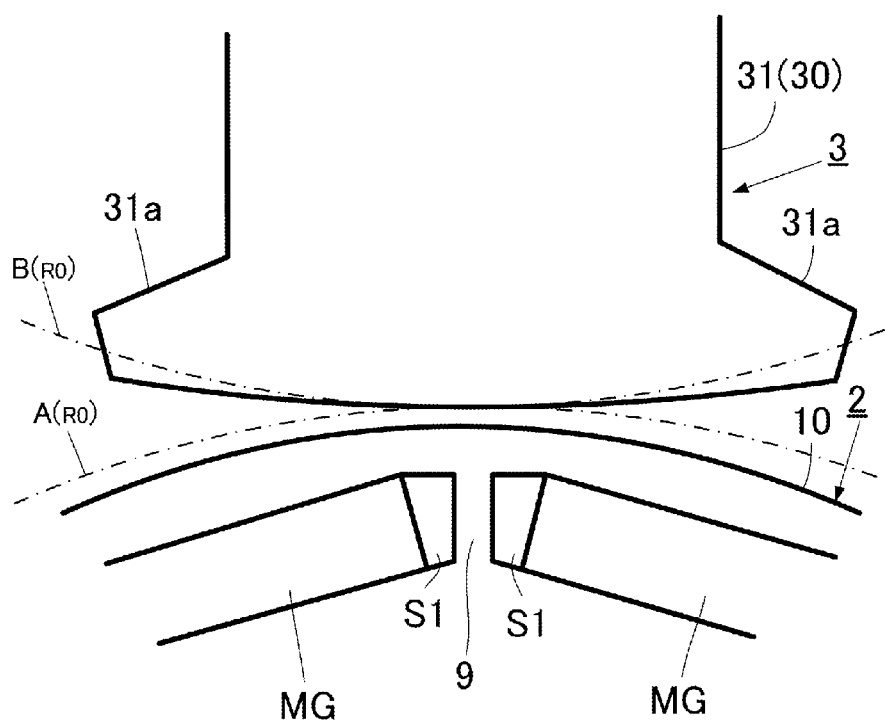
FIG. 8 is an enlarged cross-sectional view corresponding to FIG. 5 and showing a third embodiment of the present invention.

In the third embodiment, as shown in FIG. 8, the rotor facing end face of the rotor side end portion of each tooth portion 30 (first tooth portion 31) is formed into a convex shape facing the outer peripheral surface of the rotor 2 (rotor main body 10) and continuously changing in cross-section and positioned between the first virtual curve A and the second virtual curve B. The first virtual curve A has a curvature radius R0 centering on a rotation axis of the rotor 2 and passing a rotor closest portion of the rotor facing end face which is closest to the outer periphery of the rotor 2 (intermediate portion in the circumferential direction in this embodiment). The second virtual curve B has the same curvature radius R0 as the curvature radius R0 of the first virtual curve A and contacting the first virtual curve A at the rotor closest portion of the rotor facing end face of the tooth portion 30 (first tooth portion 31). The second virtual curve B is convex toward the outer periphery of the rotor 2 (rotor main body 10).

Also in this embodiment, the total magnetic resistance of the second magnetic short-circuit C2 is larger than the total magnetic resistance of the first magnetic short-circuit C1. Further, the second magnetic short-circuit C2 has a total magnetic resistance value between the total magnetic resistance of the first magnetic short-circuit C1 and the total magnetic resistance of the third magnetic short-circuit C3. Therefore, also in this embodiment, when the magnetic short-circuit C changes from the second magnetic short-circuit C2 to the third magnetic short-circuit C3 and from the third magnetic short-circuit C3 to the second magnetic short-circuit C2, the change ratio of the magnetic resistance is smaller than in the comparative example. This changes the the number of magnetic flux interlinked with the stator winding of the permanent magnet piece MG, resulting in a reduced peak value of the induced voltage induced to the stator winding as compared with the comparative example. Therefore, as compared with the comparative example, the upper limit of the number of revolutions of the rotor 2 can be further increased. Since the other structures are the same as those of the first embodiment, the explanations thereof will be omitted.

Also in this third embodiment, both circumferential end portions of the rotor facing end face of the rotor side end portion of each tooth portion 30 are positioned between the first virtual curve A and the second virtual curve B in the cross-sectional view. The first virtual curve A has a curvature radius R0 centering on a rotation axis of the rotor 2 and passing a rotor closest portion of the rotor facing end face which is closest to the outer periphery of the rotor 2 (circumferential intermediate portion in this embodiment). The second virtual curve B has the same curvature radius R0 as the curvature radius R0 of the first virtual curve A and contacts the first virtual curve A at the rotor closest portion of the rotor facing end face. The second virtual curve B is convex toward the outer periphery of the rotor (see FIG. 8).

Fourth Embodiment

An electric rotating machine according to a fourth embodiment of the present invention is a radial gap type electric motor preferably used as an electric motor for an electric motorcycle, as similar to the first embodiment. This radial gap type electric motor of this second embodiment is almost the same in basic structure as the electric motor of the first embodiment.

Figure 9:
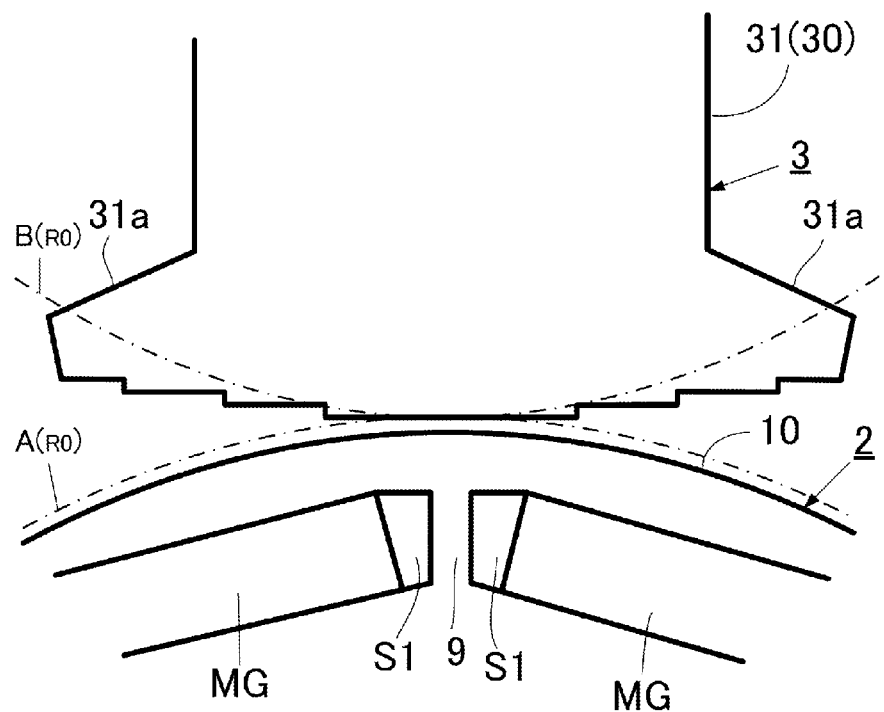
FIG. 9 is an enlarged cross-sectional view corresponding to FIG. 5 and showing a fourth embodiment of the present invention.

In the fourth embodiment, as shown in FIG. 9, the rotor facing end face of the rotor side end portion of each tooth portion 30 (first tooth portion 31) is formed into a cross-sectional shape in which the distance from the outer peripheral surface of the rotor 2 (rotor main body 10) is increased step-wisely from a circumferential intermediate portion toward circumferential end portions.

Also in this embodiment, the total magnetic resistance of the second magnetic short-circuit C2 is larger than the total magnetic resistance of the first magnetic short-circuit C1. Further, the second magnetic short-circuit C2 has a total magnetic resistance value between the total magnetic resistance of the first magnetic short-circuit C1 and the total magnetic resistance of the third magnetic short-circuit C3. Therefore, also in this embodiment, when the magnetic short-circuit C changes from the second magnetic short-circuit C2 to the third magnetic short-circuit C3 and from the third magnetic short-circuit C3 to the second magnetic short-circuit C2, the change ratio of the magnetic resistance is smaller than in the comparative example. This changes the number of magnetic flux interlinked with the stator winding of the permanent magnet piece MG, resulting in a reduced peak value of the induced voltage induced to the stator winding as compared with the comparative example. Therefore, as compared with the comparative example, the upper limit of the number of revolutions of the rotor 2 can be further increased. Since the other structures are the same as those of the first embodiment, the explanations thereof will be omitted.

Also in this fourth embodiment, both circumferential end portions of the rotor facing end face of the rotor side end portion of each tooth portion 30 are positioned between the first virtual curve A and the second virtual curve B in the cross-sectional shape. The first virtual curve A has a curvature radius R0 centering on a rotation axis of the rotor 2 and passing a rotor closest portion of the rotor facing end face which is closest to the outer periphery of the rotor 2 (circumferential intermediate portion in this embodiment). The second virtual curve B has the same curvature radius R0 as the curvature radius R0 of the first virtual curve A and contacts the first virtual curve A at the rotor closest portion of the rotor facing end face. The second virtual curve B is convex toward the outer periphery of the rotor (see FIG. 9).

Example 1

Figure 16:
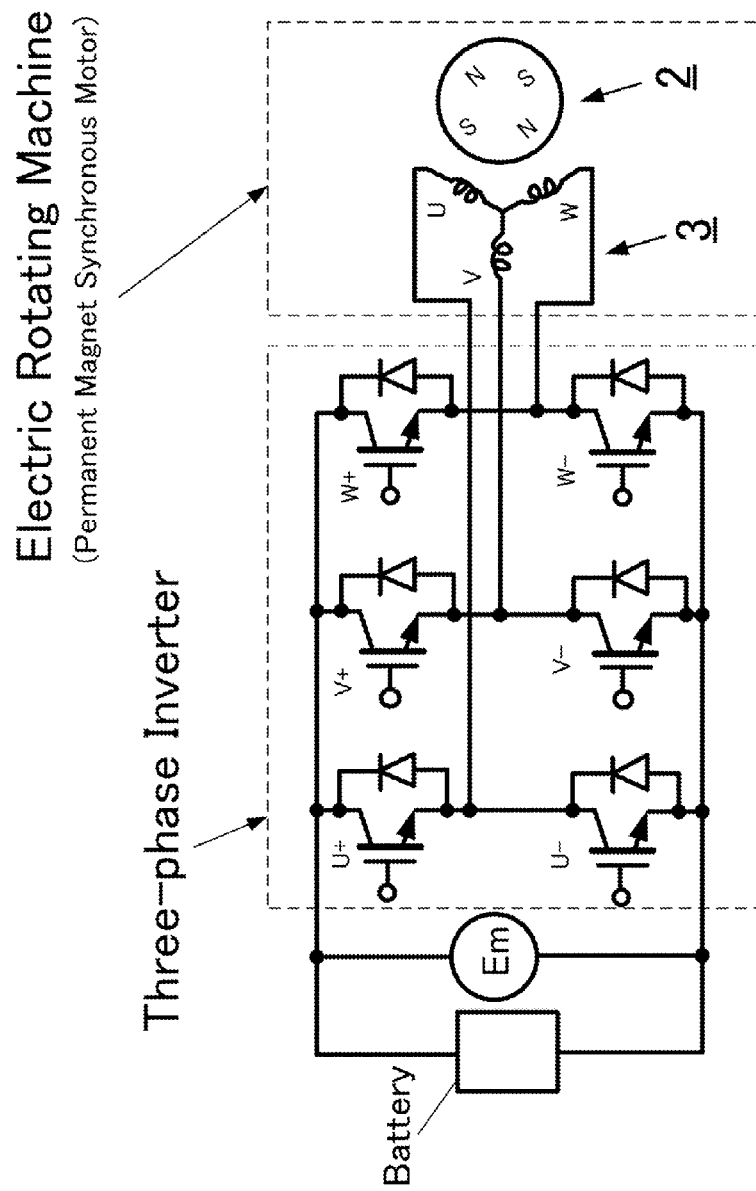
FIG. 16 is a schematic view showing an electric circuit for driving an electrical rotating machine according to an embodiment of the present invention.

An electric rotating machine (in which the rotor facing end face of the rotor side end portion of each tooth portion has a curvature radius R1 larger than the curvature radius of the first virtual curve A having a curvature radius R0 centering on a rotation axis of the rotor 2 and passing a rotor closest portion of the rotor facing end face which is closest to the outer periphery of the rotor 2) was used. As shown in FIG. 16, a power supply equipped with a battery and a three-phase inverter circuit as a driving force was connected to the electric rotating machine. In the first state and the second state in which the second tooth portion 32 as a movable divided tooth portion was moved to the first position and the second position, respectively, the rotor 2 was rotated.

The magnetic flux interlinked with the stator winding of the U phase of the tooth portion 30 (first tooth portion 31) and the terminal voltage on the battery side of the inverter circuit in each position were examined. As a comparative example, using the electric rotating machine as shown in FIGS. 10A and 10B, in the same manner as mentioned above, the magnetic flux interlinked with the stator winding of the U phase of the tooth portion 30 (first tooth portion 31) and the terminal voltage on the battery side of the inverter circuit in each position were examined. These results are shown in the graphs of FIG. 12A to FIG. 12D. When the curvature of the rotor side end portion of the tooth portion 30 (first tooth portion 31) in the comparative example was set to 1, in the first embodiment, the curvature of the rotor side end portion of the tooth portion 30 (first tooth portion 31) was set to 0.4.

Figure 12A:
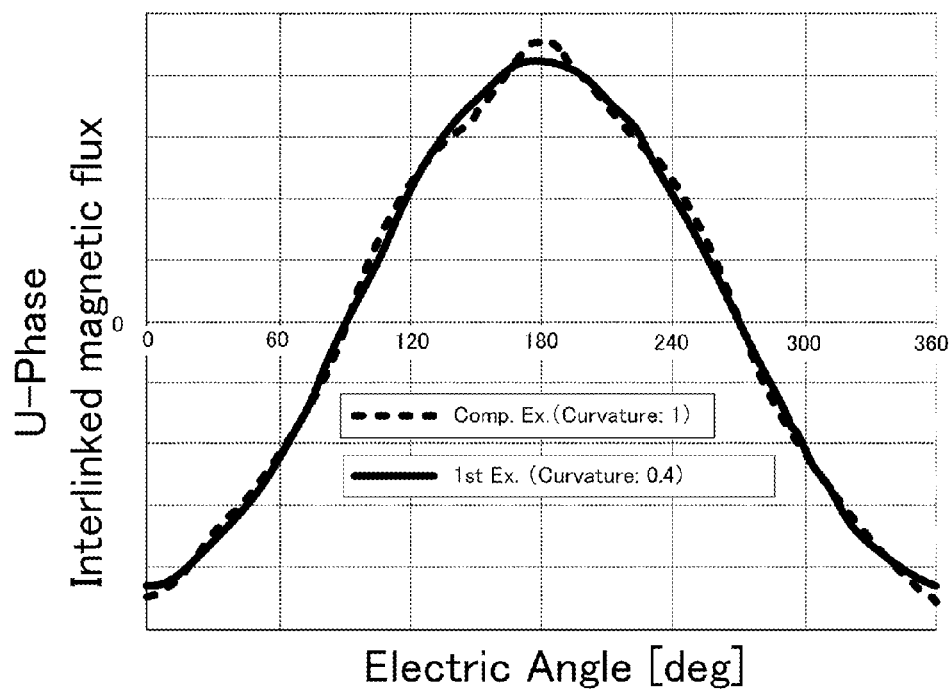
FIG. 12A is a graph comparing and showing changes in magnetic flux of the permanent magnets of the rotor interlinked with the stator winding in the first state (the divided tooth portion is in the first position) in the first embodiment and the comparative example.
Figure 12B:
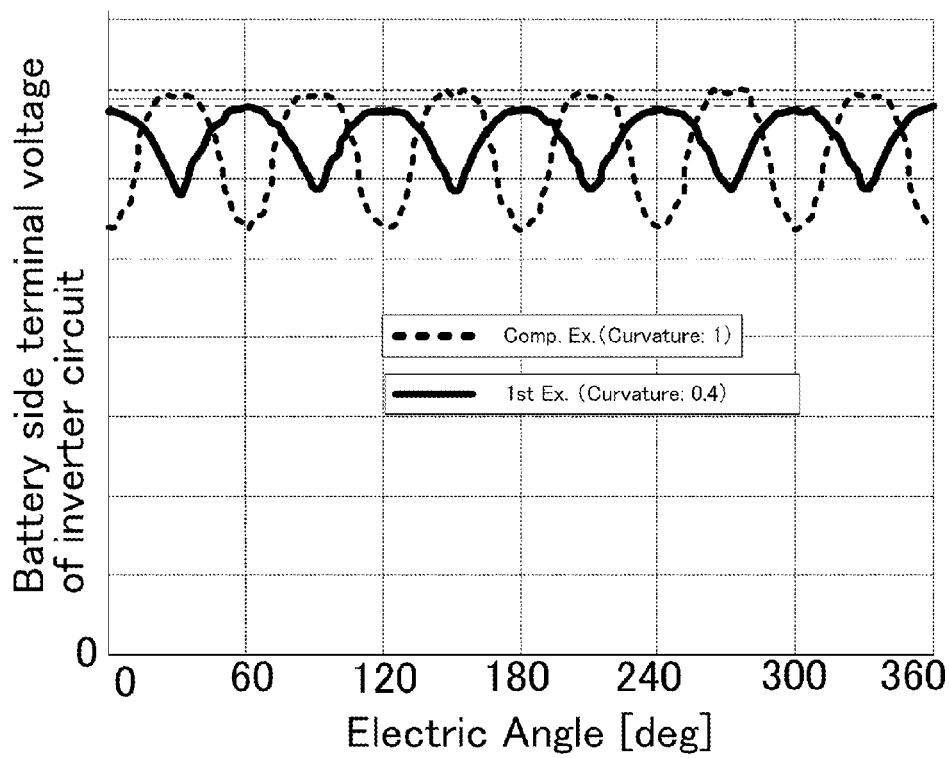
FIG. 12B is a graph comparing and showing the voltage generated at the battery side terminal of the inverter circuit in the first state (the divided tooth portion is in the first position) in the first embodiment and the comparative example.
Figure 12C:
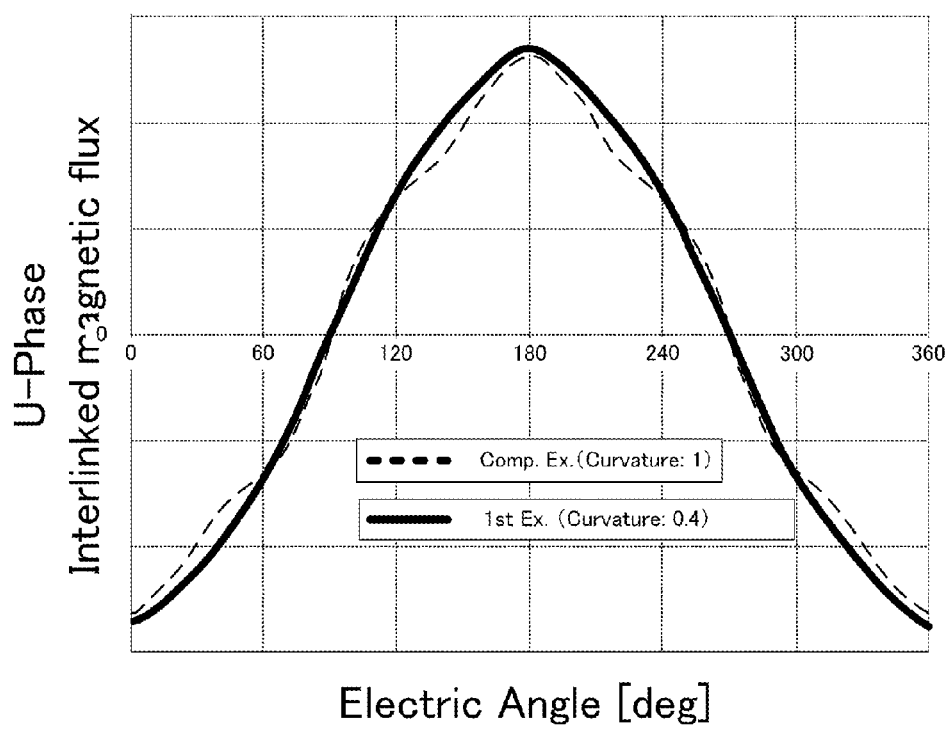
FIG. 12C is a graph comparing and showing changes in magnetic flux of the permanent magnets of the rotor interlinked with the stator winding in the second state (the divided tooth portion is in the second position) in the first embodiment and the comparative example.
Figure 12D:
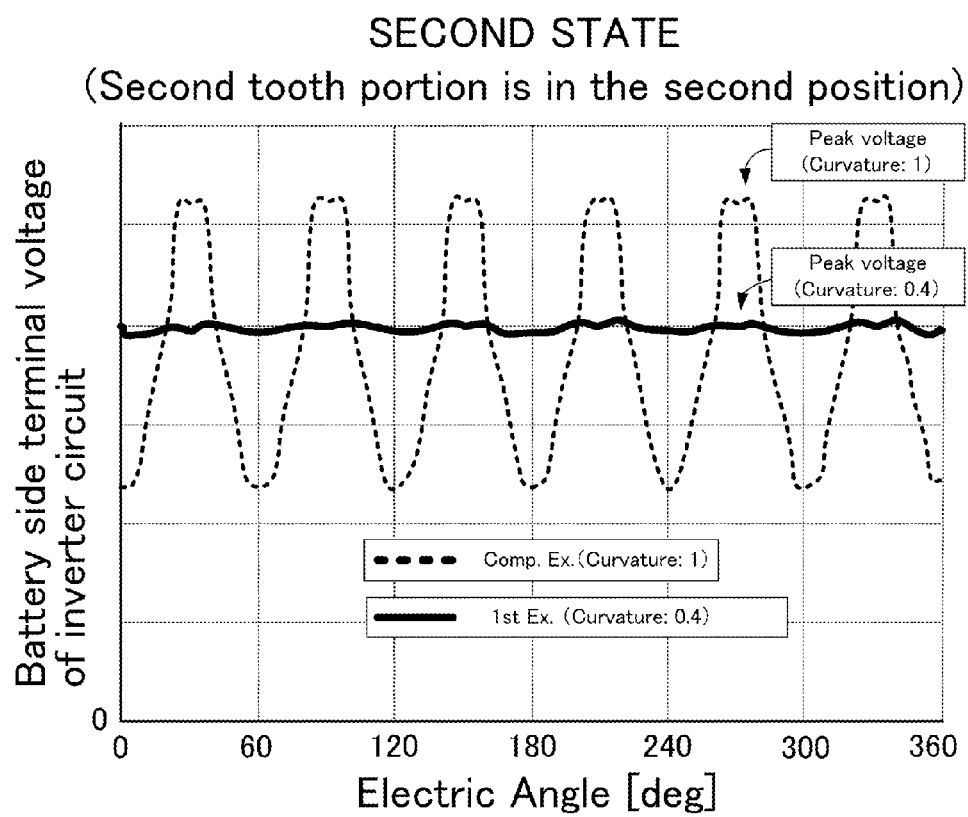
FIG. 12D is a graph comparing and showing the voltage generated at the battery side terminal of the inverter circuit in the second state (the divided tooth portion is in the second position) in the first embodiment and the comparative example.

From these results, it is understood that, at the second position (second state) in which the movable divided tooth portion was moved in the circumferential direction and the magnetic resistance of the main magnetic circuit M was large, the local rate of change of the waveform of the magnetic flux interlinked with the stator winding was controlled and the waveform was smoothed, as shown in FIG. 12C. Therefore, as shown in FIG. 12D, the peak value of the induced voltage (battery side terminal voltage) induced to the terminal on the battery side of the inverter circuit was lower than the comparative example. In this way, it was confirmed that the peak value of the induced voltage induced to the stator winding could be suppressed and the upper limit of the number of revolutions of the rotor 2 could further be increased than the comparative example.

Example 2

As shown in FIG. 7, using an electric rotating machine in which the rotor facing end face of the rotor side end portion of the tooth portion 30 (first tooth portion 31) of the stator 3 was formed into an obtuse angle that was convex toward the rotor 2 and having the same other structures as those of the first embodiment, the rotor 2 was rotated in the first state and the second state by moving the second tooth portion 32 as a movable divided tooth portion to the first position and the second position in a state in which a power supply equipped with a battery and a three-phase inverter circuit as a driving force were connected as shown in Example 1 and FIG. 16. Then, the magnetic flux interlinked with the stator winding of the U phase of the tooth portion 30 (first tooth portion 31) and the terminal voltage on the battery side of the inverter circuit in each position were examined. Also, as a comparative example, using the electrical rotating machine as shown in FIGS. 10A and 10B, the magnetic flux interlinked with the stator winding of the U phase of the tooth portion 30 (first tooth portion 31) and the terminal voltage on the battery side of the inverter circuit in each position were examined. These results are shown in the graphs of FIG. 13A to FIG. 13D.

Figure 13A:
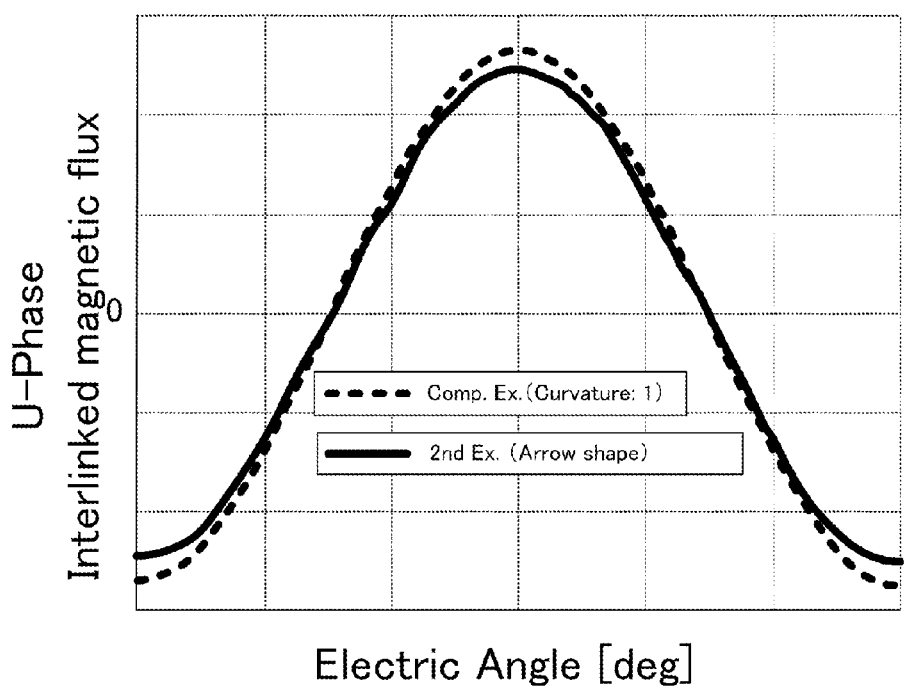
FIG. 13A is a graph comparing and showing changes in magnetic flux of the permanent magnets of the rotor interlinked with the stator winding in the first state (the divided tooth portion is in the first position) in the second embodiment and the comparative example.
Figure 13B:
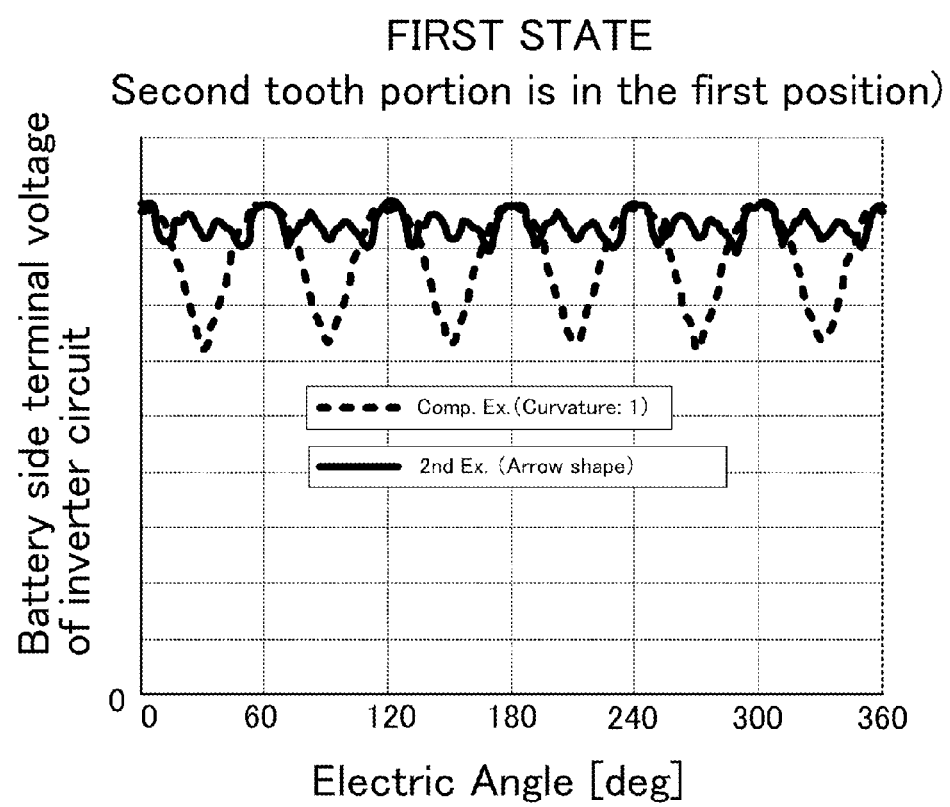
FIG. 13B is a graph comparing and showing the voltage generated in the battery side terminal of the inverter circuit in the first state (the divided tooth portion is in the first position) in the second embodiment and the comparative example.
Figure 13C:
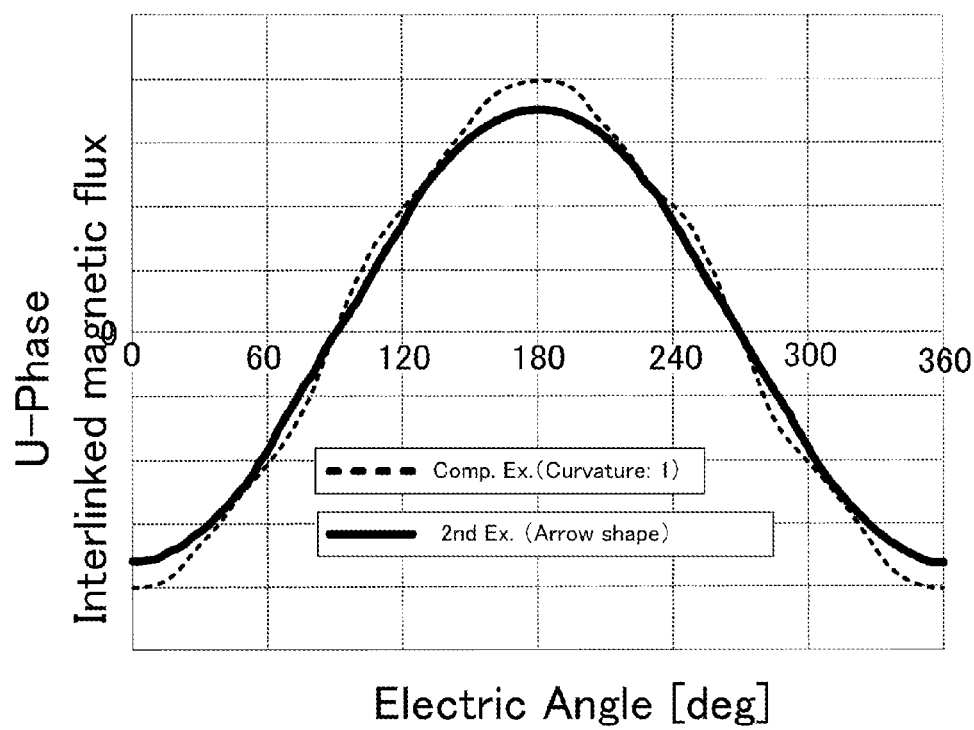
FIG. 13C is a graph comparing and showing changes in magnetic flux of the permanent magnets of the rotor interlinked with the stator winding in the second state (the divided tooth portion is in the second position) in the second embodiment and the comparative example.
Figure 13D:
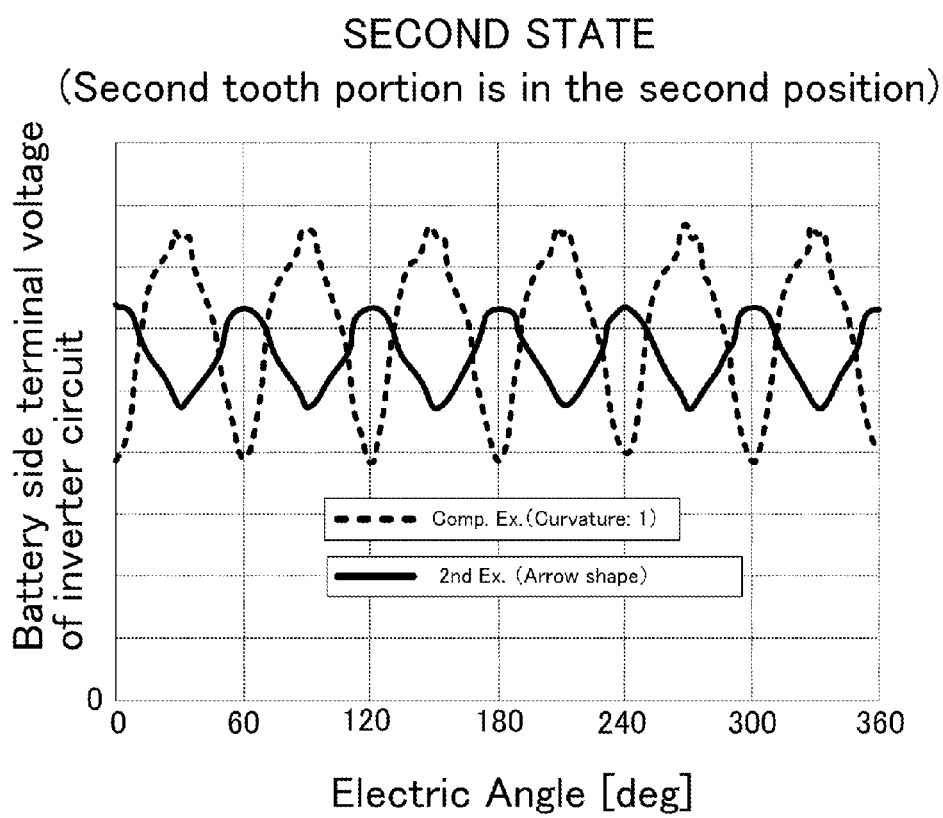
FIG. 13D is a graph comparing and showing the voltage generated in the battery side terminal of the inverter circuit in the second state (the divided tooth portion is in the second position) in the second embodiment and the comparative example.

From these results, it is understood that, at the second position (second state) in which the movable divided tooth portion was moved in the circumferential direction and the magnetic resistance of the main magnetic circuit M was large, the local rate of change of the waveform of the magnetic flux interlinked with the stator winding was controlled and the waveform was smoothed, as shown in FIG. 13C. Therefore, as shown in FIG. 13D, the peak value of the induced voltage (battery side terminal voltage) induced to the terminal on the battery side of the inverter circuit was lower than the comparative example. In this way, it was confirmed that the peak value of the induced voltage induced to the stator winding could be suppressed and the upper limit of the number of revolutions of the rotor 2 could further be increased than the comparative example.

In all of the aforementioned embodiments, it was exemplified that the permanent magnet piece MG was formed into a rectangular cross-section and fitted in the slit formed in the peripheral portion of the rotor main body. However, the present invention is not limited to that, and allows a structure in which, for example, a permanent magnet piece is formed into a cross-sectional arc shape corresponding to the outer periphery of the rotor main body and fixed to the outer peripheral surface of the rotor main body. In this case, needless to say, the permanent magnet piece should be securely fixed to the rotor main body so that it does not break loose from the rotor main body due to the centrifugal force caused by the revolution of the rotor.

The present invention can be used in place of a conventional field weakening control, but does not prevent the combined use with the conventional field weakening control.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to."

INDUSTRIAL APPLICABILITY

The electric rotating machine of the present invention can be used as an electric motor as a driving source for, e.g., various electric vehicles including electric motorcycles, and various electric machines.

The invention claimed is:

1. An electric rotating machine comprising:
   a rotor having a plurality of permanent magnets arranged at an outer peripheral portion of a rotor main body of the rotor; and
   a stator arranged outward of the rotor main body in a radial direction of the rotor main body, the stator including:
      a plurality of tooth portions arranged at predetermined intervals in a circumferential direction of the rotor;
      a stator yoke portion arranged outside of the plurality of tooth portions; and
      a magnetic resistance changing mechanism configured to change a magnetic resistance of a stator magnetic path, which is formed by the stator yoke portion and each of the plurality of tooth portions, by mechanically changing the stator magnetic path;
   wherein each respective tooth portion of the plurality of tooth portions includes a pair of side protruded portions protruding from both sides of a rotor side end portion of the respective tooth portion in the circumferential direction;
   wherein a magnetic resistance of a magnetic path formed by a gap between a pair of adjacent side protruded portions of the side protruded portions of a pair of adjacent tooth portions of the tooth portions is set to have a value so that
      when the magnetic resistance changing mechanism is in a first state in which the stator magnetic path is changed so that the magnetic resistance of the stator magnetic path is minimum or near minimum, a main magnetic path that extends from one of the magnetic poles of one of a pair of adjacent permanent magnets of the permanent magnets to one of the magnetic poles of the other of the pair of the adjacent permanent magnets is formed by a magnetic path passing substantially through the pair of adjacent tooth portions, which correspond to the pair of adjacent permanent magnets, and the stator yoke portion; and
      when the magnetic resistance changing mechanism is in a second state in which the stator magnetic path is changed so that the magnetic resistance of the stator magnetic path is maximum or near maximum, the main magnetic path is formed by a magnetic shortpath passing substantially through at least one of the rotor side end portions of the adjacent tooth portions;
   wherein in a first relative position in which adjacent end portions of the pair of adjacent permanent magnets are positioned corresponding to a circumferential intermediate portion of the rotor side end portion of one of the adjacent tooth portions, a first magnetic short-circuit C1 is a magnetic short-circuit C including a magnetic short-path passing substantially through the circumferential intermediate portion;
   wherein in a second relative position in which the adjacent end portions of the pair of adjacent permanent magnets are positioned corresponding to one of circumferential end portions of the rotor side end portion of one of the pair of adjacent tooth portions, a second magnetic short-circuit C2 is a magnetic short-circuit C including a magnetic short-path passing substantially through the one of circumferential end portions;
   wherein in a third relative position in which the adjacent end portions of the pair of adjacent permanent magnets are positioned corresponding to the pair of adjacent side protruded portions, a third magnetic short-circuit C3 is a magnetic short-circuit C including a magnetic short-path passing substantially through the gap between the pair of adjacent side protruded portions; and
   wherein when the magnetic resistance changing mechanism is in the second state, the second magnetic short-circuit C2 has a total magnetic resistance between a total magnetic resistance of the first magnetic short-circuit C1 and a total magnetic resistance of the third magnetic short-circuit C3, and is configured to control a change ratio of the total magnetic resistance of a corresponding one of the magnetic short-circuits C when the corresponding magnetic short-circuit C is changed from the second magnetic short-circuit C2 to the third magnetic short-circuit C3 and from the third magnetic short-circuit C3 to the second magnetic short-circuit C2 in accordance with a relative rotational movement of the rotor with respect to the stator.

2. The electric rotating machine as recited in claim 1, wherein for each respective tooth portion,
   both end portions of a rotor facing end face of the rotor side end portion of the respective tooth portion in the circumferential direction are positioned between a first virtual curve A and a second virtual curve B,
   the first virtual curve A is a curve having a curvature radius R0 centering on a rotation axis of the rotor and passing a rotor closest portion of the rotor facing end face that is closest to an outer periphery of the rotor, and
   the second virtual curve B is a curve having a curvature having the same curvature radius R0 as the curvature radius R0 of the first virtual curve A and contacting the first virtual curve A at the rotor closest portion of the rotor facing end face, the second virtual curve B being convex toward the outer periphery of the rotor.

3. The electric rotating machine as recited in claim 2, wherein the rotor facing end face of the rotor side end portion of each tooth portion is formed into a concave curve in cross-section that is concave toward the outer periphery of the rotor, the concave curve having a curvature radius larger than the curvature radius R0 of the first virtual curve A.

4. The electric rotating machine as recited in claim 1, wherein a rotor facing end face of the rotor side end portion of each tooth portion is formed into a cross-sectional shape in which a gap between the rotor facing end face of the rotor side end portion of each tooth portion and the outer periphery of the rotor is increased continuously or step-wisely from a circumferential intermediate portion of the rotor facing end face toward a circumferential end portion of the rotor facing end face.

5. The electric rotating machine as recited in claim 1, wherein a rotor facing end face of the rotor side end portion of each tooth portion is formed into an angular cross-sectional shape having an obtuse angle, the cross-sectional shape being convex toward the outer periphery of the rotor.

6. The electric rotating machine as recited in claim 1, wherein:
    each tooth portion is divided into a plurality of divided tooth portions in the radial direction, for each tooth portion, the plurality of divided tooth portions including a first divided tooth portion arranged at an innermost portion in the radial direction and facing an outer peripheral portion of the rotor main body and a second divided tooth portion arranged at an outermost portion in the radial direction and connected to the stator yoke portion;
    at least one of the plurality of divided tooth portions in each tooth portion includes a movable divided tooth portion relatively movable in the circumferential direction with respect to another of the divided tooth portions; and
    the movable divided tooth portions are movable between a first position and a second position, the first position and the second position being relatively different in magnetic resistance of a magnetic path formed by the plurality of divided tooth portions in each tooth portion.

7. The electric rotating machine as recited in claim 6, wherein:
    the first position is a magnetic resistance minimum position in which the plurality of divided tooth portions are aligned in the radial direction so that a magnetic resistance of a magnetic path including the plurality of divided tooth portions becomes minimum;
    the second position is a magnetic resistance maximum position in which the movable divided tooth portions are relatively moved with respect to the another divided tooth portions in the circumferential direction so that the magnetic resistance of the magnetic path including the plurality of divided tooth portions becomes maximum; and
    the movable divided tooth portions are relatively movable continuously or discontinuously within arbitrary positions between the magnetic resistance minimum position and the magnetic resistance maximum position.

8. The electric rotating machine as recited in claim 1, wherein each tooth portion is divided into two divided tooth portions in the radial direction, the two divided tooth portions including a first divided tooth portion arranged so as to face the outer peripheral portion of the rotor main body and a second divided tooth portion arranged outside of the first divided tooth portion in the radial direction via a gap.

9. The electric rotating machine as recited in claim 1, wherein each of the permanent magnets is a neodymium magnet.

10. The electric rotating machine as recited in claim 1, wherein the plurality of permanent magnets are arranged in the outer peripheral portion of the rotor main body in an embedded manner.

11. The electric rotating machine as recited in claim 1, wherein the plurality of permanent magnets are arranged on the outer peripheral portion of the rotor main body in an outwardly exposed manner.

12. A vehicle equipped with the electric rotating machine as recited in claim 1.

13. An electronic product equipped with the electric rotating machine as recited in claim 1.

14. The electric rotating machine as recited in claim 1, wherein
    in the first relative position, a first minimum radial distance from the magnetic poles of the pair of the adjacent permanent magnets to the pair of adjacent tooth portions is a first distance D1,
    in the second relative position, a second minimum radial distance from the magnetic poles of the pair of the adjacent permanent magnets to the pair of adjacent tooth portions is a second distance D2, and
    in the third relative position, a third minimum radial distance from the magnetic poles of the pair of the adjacent permanent magnets to the pair of adjacent tooth portions is a third distance D3,
    wherein D1<D2<D3.

15. An electric rotating machine comprising:
    a rotor having a plurality of permanent magnets arranged in an outer peripheral portion of a columnar rotor main body of the rotor and arranged at predetermined intervals in a circumferential direction of the rotor main body, the rotor being configured to rotate about a rotation axis; and
    a cylindrical stator arranged outside of the rotor in a radial direction of the rotor via a gap, the cylindrical stator including:
        a plurality of tooth portions arranged at intervals in the circumferential direction; and
        a cylindrical stator yoke portion arranged outside of the plurality of tooth portions;
        wherein each of the plurality of tooth portions is divided into a plurality of divided tooth portions in the radial direction, for each tooth portion, the plurality of divided tooth portions includes
            a first divided tooth portion arranged at an innermost portion in the radial direction and facing the outer peripheral portion of the rotor main body, and
            a second divided tooth portion arranged at an outermost portion in the radial direction and connected to the stator yoke portion; and
    wherein each of the plurality of tooth portions is provided with a pair of side protruded portions protruding from both sides of a rotor side end portion of the first divided tooth portion in the circumferential direction;
    wherein at least one of the plurality of divided tooth portions in each tooth portion includes a movable divided tooth portion relatively movable in the circumferential direction with respect to another of the plurality of divided tooth portions;
    wherein the movable divided tooth portions are movable between a first position and a second position, the first position and the second position being relatively different in magnetic resistance of a magnetic path formed by the plurality of divided tooth portions in each tooth portion;

wherein a main magnetic circuit M is a magnetic circuit having a magnetic path passing substantially through a pair of adjacent tooth portions of the tooth portions corresponding to a pair of adjacent ones of the permanent magnets and the stator yoke portion when the magnetic flux from one of the pair of adjacent permanent magnets reaches the other of the pair of adjacent permanent magnets;

wherein a magnetic short-circuit C is a magnetic circuit having a magnetic path passing substantially through a side of a rotor side end portion of the stator when the magnetic flux from one of the adjacent permanent magnets reaches the other adjacent permanent magnet;

wherein in a first relative position in which adjacent end portions of the pair of adjacent permanent magnets are positioned corresponding to a circumferential intermediate portion of the rotor side end portion of one of the adjacent tooth portions, a first magnetic short-circuit C1 is a magnetic short-circuit C including a magnetic short-path passing substantially through the circumferential intermediate portion;

wherein in a second relative position in which the adjacent end portions of the pair of adjacent permanent magnets are positioned corresponding to one of circumferential end portions of the rotor side end portion of one of the adjacent tooth portions, a second magnetic short-circuit C2 is a magnetic short-circuit C including a magnetic short-path passing substantially through the one of circumferential end portions; and wherein in a third relative position in which the adjacent end portions of the pair of adjacent permanent magnets are positioned corresponding to a pair of adjacent ones of the side protruded portions, a third magnetic short-circuit C3 is a magnetic short-circuit C including a magnetic short-path passing substantially through a gap between the pair of adjacent side protruded portions;

wherein when the movable divided tooth portions are in the first position, the following relational expression is satisfied:
a total magnetic resistance of the main magnetic circuit M is less than a total magnetic resistance of the third magnetic short-circuit C3;

wherein when the movable divided tooth portions are in the second position, both the following relational expressions are satisfied:
a total magnetic resistance of the third magnetic short-circuit C3 is less than a total magnetic resistance of the main magnetic circuit M; and
a total magnetic resistance of the first magnetic short-circuit C1 is less than the total magnetic resistance of the third magnetic short-circuit C3; and wherein the second magnetic short-circuit C2 has a total magnetic resistance between the total magnetic resistance of the first magnetic short-circuit C1 and the total magnetic resistance of the third magnetic short-circuit C3, and a change ratio of the total magnetic resistance of a corresponding one of the magnetic short-circuits C is controlled when the corresponding magnetic short-circuit C is changed from the second magnetic short-circuit C2 to the third magnetic short-circuit C3 and from the third magnetic short-circuit C3 to the second magnetic short-circuit C2 in accordance with a relative rotational movement of the rotor with respect to the stator.

16. The electric rotating machine as recited in claim 15, wherein for each respective tooth portion,
both end portions of a rotor facing end face of the rotor side end portion in the circumferential direction are positioned between a first virtual curve A and a second virtual curve B,
the first virtual curve A is a curve having a curvature radius R0 centering on the rotation axis of the rotor and passing a rotor closest portion of the rotor facing end face that is closest to an outer periphery of the rotor, and
the second virtual curve B is a curve having a curvature having the same curvature radius R0 as the curvature radius R0 of the first virtual curve A and contacting the first virtual curve A at the rotor closest portion of the rotor facing end face, the second virtual curve B being convex toward the outer periphery of the rotor.

17. The electric rotating machine as recited in claim 16, wherein the rotor facing end face of the rotor side end portion of each tooth portion is formed into a concave curve that is concave toward the outer periphery of the rotor, the concave curve having a curvature radius larger than the curvature radius R0 of the first virtual curve A.

18. The electric rotating machine as recited in claim 15, wherein a rotor facing end face of the rotor side end portion of each tooth portion is formed into a cross-sectional shape in which a gap between the rotor facing end face of the rotor side end portion of each tooth portion and the outer periphery of the rotor is increased continuously or step-wisely from a circumferential intermediate portion of the rotor facing end face toward a circumferential end portion of the rotor facing end face.

19. The electric rotating machine as recited in claim 15, wherein a rotor facing end face of the rotor side end portion of each tooth portion is formed into an angular cross-sectional shape having an obtuse angle, the cross-sectional shape being convex toward the outer periphery of the rotor.

20. The electric rotating machine as recited in claim 15, wherein
in the first relative position, a first minimum radial distance from the magnetic poles of the pair of the adjacent permanent magnets to the pair of adjacent tooth portions is a first distance D1,
in the second relative position, a second minimum radial distance from the magnetic poles of the pair of the adjacent permanent magnets to the pair of adjacent tooth portions is a second distance D2, and
in the third relative position, a third minimum radial distance from the magnetic poles of the pair of the adjacent permanent magnets to the pair of adjacent tooth portions is a third distance D3,
wherein D1<D2<D3.

* * * * *